United States Patent
Lanier

(10) Patent No.: US 7,626,569 B2
(45) Date of Patent: Dec. 1, 2009

(54) MOVABLE AUDIO/VIDEO COMMUNICATION INTERFACE SYSTEM

(75) Inventor: Jaron Lanier, Sausalito, CA (US)

(73) Assignee: Graphics Properties Holdings, Inc., Palo Alto, CA (US)

( * ) Notice: Subject to any disclaimer, the term of this patent is extended or adjusted under 35 U.S.C. 154(b) by 591 days.

(21) Appl. No.: 11/255,920

(22) Filed: Oct. 24, 2005

(65) Prior Publication Data

US 2006/0119572 A1 Jun. 8, 2006

Related U.S. Application Data

(60) Provisional application No. 60/621,085, filed on Oct. 25, 2004.

(51) Int. Cl.
*G09G 5/00* (2006.01)
(52) U.S. Cl. ............... 345/156; 348/14.16; 348/42; 715/751; 715/757
(58) Field of Classification Search ............. 348/14.16, 348/42–53; 345/156; 715/751, 153, 756, 715/757
See application file for complete search history.

(56) References Cited

U.S. PATENT DOCUMENTS

| 218,457 | A | | 8/1879 | Schultheis |
|---|---|---|---|---|
| 218,458 | A | | 8/1879 | Shaw |
| 1,072,014 | A | | 9/1913 | Kudla |
| 5,347,306 | A | * | 9/1994 | Nitta ..................... 348/14.1 |
| 5,736,982 | A | * | 4/1998 | Suzuki et al. ............ 715/706 |
| 6,222,939 | B1 | | 4/2001 | Wiskott et al. |
| 6,272,231 | B1 | | 8/2001 | Maurer et al. |
| 6,301,370 | B1 | | 10/2001 | Steffens et al. |
| 6,455,595 | B1 | | 9/2002 | O'Rear et al. |
| 6,492,986 | B1 | * | 12/2002 | Metaxas et al. ............ 345/420 |
| 6,563,950 | B1 | | 5/2003 | Wiskott et al. |
| 6,580,811 | B2 | | 6/2003 | Maurer et al. |
| 6,714,661 | B2 | | 3/2004 | Buddenmeier et al. |
| 2002/0075286 | A1 | * | 6/2002 | Yonezawa et al. ......... 345/679 |

(Continued)

FOREIGN PATENT DOCUMENTS

WO WO 99/53443 10/1999

OTHER PUBLICATIONS

Mojtaba Hosseini, Nicolas D. Georganas, "Design of a Multi-sender 3D Videoconferencing Application over an End System Multicast Protocol", Nov. 2-8, 2003.*

(Continued)

*Primary Examiner*—Amare Mengistu
*Assistant Examiner*—Koosha Sharifi
(74) *Attorney, Agent, or Firm*—Sunstein Kann Murphy & Timbers LLP

(57) ABSTRACT

A system that includes a desk top assembly of a display and sensors mounted on a robotic arm. The arm moves the assembly so that it remains within position and orientation tolerances relative to the user's head as the user looks around. Near-field speaker arrays supply audio and a microphone array senses a user's voice. Filters are applied to head motion to reduce latency for arm's tracking of the head. The system is full duplex with other systems allowing immersive collaboration. Lighting and sound generation take place close to the user's head. A haptic interface device allows the user to grab the display/sensor array and move it about. Motion acts as a planar selection device for 3D data. Planar force feedback allows a user to "feel" the data. Users see not only each other through display windows, but can also see the positions and orientations of each others' planar selections of shared 3D models or data.

1 Claim, 15 Drawing Sheets

U.S. PATENT DOCUMENTS

| | | | |
|---|---|---|---|
| 2003/0035001 A1* | 2/2003 | Van Geest et al. | 345/753 |
| 2003/0067536 A1* | 4/2003 | Boulanger et al. | 348/14.08 |
| 2004/0155902 A1* | 8/2004 | Dempski et al. | 345/757 |
| 2005/0007445 A1* | 1/2005 | Foote et al. | 348/14.08 |
| 2005/0068294 A1* | 3/2005 | Cheng | 345/161 |
| 2005/0110867 A1* | 5/2005 | Schulz | 348/14.05 |

OTHER PUBLICATIONS

Lanier, Jaron. "*Virtually There*," Scientific American, Apr. 2001, pp. 66-75.

Towles, H., Wei-Chao Chen, Ruigang Yang, Sang-Uok Kum, Henry Fuchs, Nikhil Kelshikar, Jane Mulligan, Kostas Daniilidis, Loring Holden, Bob Zeleznik, Amela Sadagic and Jaron Lanier. "*3D Tele-Collaboration Over Internet2*", International Workshop On Immersive Telepresence (ITP2002) Dec. 2002.

Buxton, W. & Fitzmaurice, G.W.(1998). "*HMD's, Caves & Chameleon: A Human-Centric Analysis of Interaction in Virtual Space*", Computer Graphics: The SIGGRAPH Quarterly, 32(4), 64-68.

From Ales Leonardis and Ruzena Bajcsy (Eds.) "*The Confluence of Computer Graphics and Vision*", NATO Advanced Research Workshop Series, KLuwer Academic Publishers, 2000.

N. Kelshikar et al., "*Real-time Terascale Implementation of Tele-immersion*," submitted to the Terascale Performance Workshop, 2003.

Oliver G. Staadt, A. Kunz, M. Meier, Markus Gross, "*The Blue-C Integrating Real Humans into a Networked Immersive Environment*," Proceedings of ACM Collaborative Virtual Environments, Sep. 10-12, 2000,pp. 202-202.

H. Harlyn Baker, Donald Tanguay, Irwin Sobel, Dan Gelb Michael E. Goss, W. Bruce Culbertson, Thomas Malzbender, "*The Coliseum Immersive Teleconferencing System*," International Workshop on Immersive Telepresence, Dec. 6, 2002, Juan Les Pins, France.

David Nguyen, John Canny, "*MultiView: Spatially Faithful Group Video Conferencing*," CHI 2005, Apr. 2-7, 2005.

Jun Rekimoto, "*TransVision: A Hand-held Augmented Reality System for Collaborative Design*", Virtual Systems and Multi-Media (VSMM)'96, 1996.

Mark Billinghurst, Hirokazu Kato, "*Collaborative Mixed Reality*," IN Proceedings of the First International Symposium on Mixed Reality (ISMR '99). Mixed Reality—Merging Real and Virtual Worlds, pp. 261-284. Berlin: Springer Verlag.

Norbert A. Streitz, Jörg Geißler, Torsten Holmer, Shin'ichi Konomi, Christian Müller-Tomfelde, Wolfgang Reischl, Petra Rexroth, Peter Seitz, Ralf Steinmetz, "*i-LAND: An interactive Landscape for Creativity and Innovation*", Proceedings of the ACM Conference on Human Factors in Computing Systems (CHI'99), Pittsburgh, Pennsylvania, U.S.A., May 15-20, 1999. ACM Press, New York. pp. 120-127.

K. Arthur, T. Preston, R.M. Taylor II, F.P. Brooks, Jr., M.C. Whitton, and W.V. Wright, "*Designing and Building the Pit: A Head-Tracked Stereo Workspace for Two Users*", Technical Report TR98-015, UNC Chapel Hill, 1998.

Igor-Sunday Pandzic, Tolga K. Capin, Nadia Magnenat Thalmann, Daniel Thalmann, "*Virtual Life Network: a Body-Centered Networked Virtual Environment*" Presence, MIT, vol. 6, No. 6, 1997, pp. 676-686.

Daniel Wagner, Dieter Schmalstieg, "*First Steps Towards Handheld Augmented Reality*," Proceedings of the 7th International Conference on Wearable Computers, White Plains, NY, USA, Oct. 21-23, 2003.

Andreas Butz, Tobias Höllerer, Clifford Beshers, Steven Feiner and Blair MacIntyre, "*An Experimental Hybrid User Interface for Collaboration*", Columbia University, Department of Computer Science, Technical Report CUCS-005-99.

Andreas Butz and Antonio Krüger, "*A Generalized Peephole Metaphor for Augmented Reality and Instrumented Environments*", in Proceedings of The International Workshop on Software Technology for Augmented Reality Systems (STARS), Oct. 7, 2003 in Tokyo, Japan.

Zsolt Szalavári, Michael Gervautz, "*Using the Personal Interaction Panel for 3D Interaction*", Proceedings of the Conference on Latest Results in Information Technology, Budapest, Hungary, pp. 3-6, May 1997.

Anastasia Cheetham, Cynick Young, Deboreah Fels, "*Interface Development for a Child's Video Conference Robot*," CSUN '99.

Haruo Noma, Tsutomu Miyasato, Fumio Kishino, "*A Palmtop Display for Dextrous Manipulation with Haptic Sensation*", CHI 96, Apr. 13-18, 1996, Vancouver, BC Canada.

Fitzmaurice, G., "*Situated Information Spaces And Spatially Aware Palmtop Computers*," Communications Of The ACM, Jul. 1993/vol. 36, No. 7, pp. 39-49.

Michael Tsang, George W. Fitzmaurice, Gordon Kurtenbach, Azam Khan, Bill Buxton, "*Boom Chameleon: Simultaneous Capture of 3D Viewpoint, Voice And Gesture Annotations On A Spatially-Aware Display*"; UIST'02, Oct. 27-30, 2002, Paris, France.

"VideoBots: Robotic Avatars for Desktop Teleconferencing", Posted on the FxPal company website, Tuesday, Aug. 9, 2005 11:06:26 AM: http://www.fxpal.com/?p=videobots.

K. Daniilidis, C. Krauss, M. Hansen and G. Sommer, "*Real-Time Tracking of Moving Objects with an Active Camera*," Real-Time Imaging 4, 3-20 (1998).

Vivek A. Sujan and Steven Dubowsky, "*An Optimal Information Method for Mobile Manipulator Dynamic Parameter Identification*,"IEEE/ASME Transactions On Mechatronics, vol. 2, No. 2, Jun. 2003.

Svante Gunnarsson, Mikael Norrlof, Enes Rahic, Markus Ozbek, "*Iteractive Learning Control of a Flexible Robot Arm Using Accelerometers*," Mekatronikm, 2003.

C.A. Shaffer and G.M. Herb, "*A Real Time Robot Arm Collision Avoidance System*", in IEEE, Trans. Rob. and Aut., vol. RA-8, No. 2, pp. 149-160 (1990).

Rainer Bischoff, "*Advances in the Development of the Humanoid Service Robot HERMES*", Bundeswehr University Munich, The Institute of Measurement Science, Second International Conference on Field and Service Robotics (FSR'99), Pittsburgh, PA, Aug. 1999.

O Khatib, K Yokoi, O Brock, K Chang, A Casal, "*Robots in Human Environments*,"Int J Rob Res, 1999.

Andreas Bischoff and Michael Gerke, "*Fuzzy Collision Avoidance Using Stereo-Vision*", Proceedings Volume from the 6th IFAC Symposium, Vienna, Austria, Sep. 21-23, 2000.

Dieter Fox, Jeffrey Hightower, Lin Liao, Dirk Schulz, Gaetano Borriello, "*Bayesian Filters for Location Estimation*," IEEE Pervasive Computing Sep. 2003.

Pieter Abbeel, Adam Coates, Michael Montemerlo, Andrew Y. Ng and Sebastian Thrun, "*Discriminative Training of Kalman Filters*," Robotics, Science and Systems, Jun. 2005.

Gavin Simmons and Yiannis Demiris, "*Optimal Robot Arm Control Using the Minimum Variance Model*," Journal of Robotic Systems 22(11), 677-690 (2005).

Gonchar L, Engel D, Raczkowsky J, Worn H., "*Virtual Simulation System For Collision Avoidance For Medical Robot*," Stud Health Technol. Inform. 2001;81:168-70.

D'Silva, Thomas. "*Neuroevolution of a Robot Arm Controller*," The University of Texas at Austin, Department of Computer Sciences. AI Technical Report 05-322. Oct. 3, 2005. 6 pages.

Qiang Ji and Zhiwei Zhu, "*Eye and Gaze Tracking for Interactive Graphic Display*", Int. Symp. On Smart Graphics, Jun. 11-13, 2002.

Su Hongtao, David Dagan Feng, Zhao Rong-chun, "*Face Recognition Using Multi-feature and Radial Basis Function Network*", Pan-Sydney Area Workshop on Visual Information Processing (VIP2002), Conferences in Research and Practice in Information Technology, vol. 22. J. S. Jin, P. Eades, D. D. Feng, H. Yan, Eds.

Thomas A. Defanti, Jason Leigh, Maxine D. Brown, Daniel J. Sandin, Oliver Yu, Chong Zhang, Rajvikram Singh, Eric He, Javid Alimohideen, Naveen K. Krishnaprasad, Robert Grossman, Marco Mazzucco, Larry Smarr, Mark Ellisman, Phil Papadopoulos, Andrew Chien, John Orcutt, "*Teleimmersion and Visualization with the OptIPuter*," Proceedings of the 12th International Conference on Artificial Reality and Telexistence (ICAT 2002).

Maia Garau, Mel Slater, Vinoba Vinayagamoorthy, Andrea Brogni, Anthony Steed, M. Angela Sasse, "*The Impact of Avatar Realism and*

Eye Gaze Control on Perceived Quality of Communication in a Shared Immersive Virtual Environment", CHI 2003, Apr. 5-10, 2003.

James Samuel Goddard, Jr., "Pose And Motion Estimation From Vision Using Dual Quaternion-Based Extended Kalman Filtering," A Dissertation Presented for the Doctor of Philosophy Degree, The University of Tennessee, Knoxville, Dec. 1997.

Mun Wai Lee, Surendra Ranganath, "Pose-Invariant Face Recognition Using a 3D Deformable Model," Pattern Recognition 36 (2003) 1835-1846.

Ying Shan, Zicheng Liu, Zhengyou Zhang, "Model-Based Bundle Adjustment with Application to Face Modeling", ICCV 2001 ,vol. II, p. 644-651.

Jane Mulligan and Kostas Daniilidis, "Real Time Trinocular Stereo For Tele-Immersion", Proceedings of the 2001 International Conference on Image Processing (ICIP'01), Thessaloniki, Greece, Oct. 2001.

Jane Mulligan, Volkan Isler and Kostas Daniilidis, "Trinocular Stereo: A Real-Time Algorithm and its Evaluation", Proceedings of the IEEE Workshop on Stereo and Multi-Baseline Vision, Kauai, HI, Dec. 2001.

E. Hjelmås. "Feature-Based Face Recognition". NOBIM Proceedings (Norwegian Image Processing and Pattern Recognition Conference), 2000.

Jane Mulligan, Xenophon Zabulis, Nikhil Kelshikar, and Kostas Daniilidis, "Stereo-Based Environment Scanning for immersive Telepresence", IEEE Transactions On Circuits And Systems For Video Technology, vol. 14, No. 3, Mar. 2004.

Zicheng Liu, Ying Shan, Zhengyou Zhang, "Expressive Expression Mapping with Ratio Images", SIGGRAPH 2001.

Jane Mulligan and Kostas Daniilidis, "View-Independent Scene Acquisition for Tele-Presence", International Symposium Of Augmented Reality, Munich, Oct. 5-6, 2000.

Ashish Kapoor and Rosalind W. Picard, "Real-Time, Fully Automatic Upper Facial Feature Tracking", Proceedings from 5th International Conference on Automatic Face and Gesture Recognition, May 2002.

Michael J. Jones and Paul Viola, "Face Recognition Using Boosted Local Features", IEEE International Conference on Computer Vision 2003.

Kenneth Wang, Venkataraman Sundareswaran, Clement Tam, Philbert Bangayan1Pavel Zahorik, "Efficient And Effective Use Of Low-Cost 3d Audio Systems", Proceedings of the 2002 International Conference on Auditory Display, Kyoto, Japan, Jul. 2-5, 2002.

B. Shinn-Cunningham, "Applications of Virtual Auditory Displays", Proceedings of the 20 International Conference of the IEEE Engineering in Biology and Medicine Society, vol. 20, No. 3, 1998.

Martin Naef, Oliver Staadt, Markus Gross, "Spatialized Audio Rendering for Immersive Virtual Environments"; VRST'02, Nov. 11-13, 2002, Hong Kong.

Dodgson, N. A., "Autostereoscopic 3D Displays", pp. 31-36, IEEE Computer, Aug. 2005.

Schowengerdt, B.T. and Seibel, E.J. (2004), "True Three-Dimensional Displays That Allow Viewers To Dynamically Shift Accommodation, Bringing Objects Displayed At Different Viewing Distances Into And Out Of Focus," CyberPsychology & Behavior, 7(6), 610-620.

Phil Surman, Ian Sexton, Richard Bates, Wing Kai Lee, Michael Craven, Kam Chaun Yow, "Beyond 3D Television: The Multi-modal, Multi-viewer TV System of the Future", SID/SPIE FLOWERS'2003, Korolev, Moscow Region, Russia, Aug. 25-28, 2003. pp. 208-210.

N. A. Dodgson[1], J. R. Moore[2], S. R. Lang[3], "Multi-View Autostereoscopic 3d Display"; IBC '99 (International Broadcasting Convention), Sep 10-14, 1999, Amsterdam, pp. 497-502.

"Iris-3D—Technical Overview"; Posted at http://www.iris3d.com/main/?page_id=30 earlier than Sunday, Nov. 27, 2005 04:48 am.

Janusz Konrad, "Visual Communications of Tomorrow: Natural, Efficient and Flexible", IEEE Communications Magazine, vol. 39, No. 1, pp. 126-133, Jan. 2001.

Michael Starks, "Stereoscopic Imaging Technology", 3DTC Corporation, Posted at www.3dmagic.com in 1996.

Phil Surman, PhD, Thesis, "Head Tracking Two-Image 3d Television Displays. (Chapter1)", De Montfort University—Leicester, UK, Jun. 2002.

S.A. Benton, T.E. Slowe, A.B. Kropp, and S.L. Smith, "Micropolarizer-Based Multiple-Viewer Autostereoscopic Display," J.O. Merritt, S.S. Fisher, and M.T. Bolas, Eds., SPIE Proc. vol. 3639 Stereoscopic Displays and Virtual Reality Systems VI (SPIE, Jan. 1999) paper 3639-10.

D.F. McAllister, "Display Technology: Stereo & 3D Display Technologies", entry in Wiley Encyclopedia on Imaging, Jan. 2002, pp. 1327-1344.

Ruigang Yang, Marc Pollefeys, Hua Yang, And Greg Welch, "A Unified Approach To Real-Time, Multi-Resolution, Multi-Baseline 2d View Synthesis and 3D Depth Estimation Using Commodity Graphics Hardware", International Journal of Image and Graphics vol. 4, No. 4 (2004) 627-651.

Ruigang Yang, Greg Welch, Gary Bishop, "Real-Time Consensus-Based Scene Reconstruction using Commodity Graphics Hardware", Proceedings of the 10th Pacific Conference on Computer Graphics and Applications, 2002.

Stefan Leitner, Alois Sontacchi, Robert Holdrich, "Multichannel Sound Reproduction System for Binaural Signals—The Ambisonic Approach"; Institute of Electronic Music and Acoustics, University of Music and Dramatic Arts in Graz, Proceedings of the Cost G-6 Conference on Digital Audio Effects (DAFX-00), Verona, Italy, Dec. 7-9, 2000.

J. Leigh, Yu, O., Schonfeld, D., Ansari, R., He, E., Nayak, A., Krishnaprasad, N., Park, K., Cho, Y, Hu, L., Fang, R., Verlo, A., Winkler, L., DeFanti, T., "Adaptive Networking for Tele-Immersion", Proceedings of the Immersive Projection Technology/Eurographics Virtual Environments Workshop (IPT/EGVE), Stuttgart, Germany May 16, 2001-May 18, 2001.

David E. Ott and Ketan Mayer-Patel, "Coordinated Multi-Streaming for 3D Tele-Immersion", MM'04, Oct. 10-16, 2004.

Tom DeFanti, Dan Sandin, Maxine Brown, Dave Pape, Josephine Anstey, Mike Bogucki, Greg Dawe, Andy Johnson, Thomas S. Huang , "Technologies for Virtual Reality/Tele-Immersion Applications: Issues of Research in Image Display and Global Networking", EC/NSF Workshop on Research Frontiers in Virtual Environments and Human-Centered Computing, Jun. 1-4, 1999, Chateau de Bonas, France.

Ray Fang, Dan Schonfeld, Rashid Ansari, Jason Leigh, "Forward Error Correction for Multimedia and Teleimmersion Data Streams", Electronic Visualization Laboratory, University of Illinois at Chicago, Internal Technical Report, Feb. 1, 2000.

Jason Leigh, Kyoung Park, Robert V. Kenyon, Andrew E. Johnson, Thomas A. DeFanti, Hong-Yee Wong, "Preliminary STAR TAP Tele-Immersion Experiments between Chicago and Singapore", HPC Asia '98.

Anton Nijholt, Job Zwiers, Jan Peciva, "The Distributed Virtual Meeting Room Exercise", ICMI'05, Oct. 2005, Trento, Italy.

"Collaborative Autostereo 3D Display System"; Product brochure posted at http://www.ginetiq.com/home/technologies/technologies/optronics/pad/hpv/3d.html in 2005.

Mark Billinghurst, Adrian Cheok, Hirokazu Katoc, Simon Prince, "Real World Teleconferencing", CHI'99.

* cited by examiner

MOVABLE AUDIO/VIDEO COMMUNICATION INTERFACE SYSTEM

CROSS-REFERENCE TO RELATED APPLICATION

This application is related to and claims priority to U.S. provisional application entitled A Movable Audio Video Communication Interface System having Ser. No. 60/621,085, by Lanier, filed Oct. 25, 2004 and incorporated by reference herein.

BACKGROUND OF THE INVENTION

1. Field of the Invention

The present invention is directed to a system for immersing a user into a multi-dimensional collaborative environment using position tracking to adjust a position of a display displaying a 3D scene and/or other participants in the collaboration.

2. Description of the Related Art

In the past a number of different technologies have been used to help people collaborate at a distance by coupling them together in some sort of common environment. These technologies have includes conference telephone systems, video telephones, networked head mounted displays, collaborative document software, etc. These technologies suffer from an inability to create a viable personal communications and computing environment for collaboration among individuals in part because the underlying sensor and display components are not used in a way that allows them to perform well enough to meet human factors needs. What is needed is a better such system.

For instance, video conferencing systems cannot provide true sight lines between participants, because the camera and display are in different positions. Therefore eye contact between participants is impossible. This problem has led to a very large number of attempted solutions over a period of three quarters of a century.

One class of solutions is to reduce the effects of imperfect sight lines by the use of other design elements, while another is to find ways to generate accurate sight lines. Accurate sight lines require dynamic tracking of the positions of the eyes of users, and generally require that the visual scene presented to each eye be digitally reconstructed to be of the correct perspective, since it is difficult to consistently place a physical camera at the correct position to capture the proper perspective. This approach is generally called tele-immersion. A tele-immersion example is Jaron Lanier's prototype described in the Scientific American article referenced. Several problems have made tele-immersion systems impractical. One is that displays and eye-position sensors that are currently available or are foreseen to be available in the near future do not work well outside of narrow tolerances for the position and orientation of the user's head. For instance, in order for participants to be able to be apparently placed close to each other in a shared virtual space, stereo vision must be supported, but for each eye to see a unique point of view, either some form of eyeware must be worn, or an autostereo display must be used, but available autostereo displays place restrictions on a user's head position. Because of these problems, it has been difficult to design tele-immersion systems that combine true sight lines, full duplex (meaning that users can see each other without problems due to intervening machinery such as stereo viewing glasses), and flexible virtual placement (meaning that viewers can be placed at any distance, near or far, and in any arrangement.) Another problem has been that tele-immersion systems have generally required dedicated rooms, which has limited their practicality. The physical layout of tele-immersion instrumentation has placed restrictions on the virtual layout of participants in the virtual space. The blue-c system generates true sight lines but places restrictions on relative placements of users in virtual space, cannot support high resolution sensing or display with currently available components, and requires dedicated rooms. The HP Coliseum system cannot support true sight lines and generalized placement of participants at the same time.

SUMMARY OF THE INVENTION

It is an aspect of the present invention to provide a personal communications and computing environment that can also be used for collaboration among individuals.

It is another aspect of the present invention to provide an immersive type collaboration experience.

It is also an aspect of the present invention to provide an immersive type experience that can be easily integrated with other modes of working.

It is also an aspect of the present invention to provide an immersive type of experience without requiring large resources of floor space or specialized rooms.

The above aspects can be attained by a system that includes an assembly of multimodal displays and sensors mounted on a mechanical or robotic arm rising out of a desktop or other base. The arm moves the assembly so that it remains within position and orientation tolerances relative to the user's head as the user looks around. This lowers the requirements for sensor and display components so that existing sensors and displays can work well enough for the purpose. The arm does not need to be moved with great accuracy or maintain perfect on-axis alignment and uniform distance to the face. It must merely remain within tolerances. Kalman filters are applied to head motion to compensate for latency in the arm's tracking of the head. Tele-immersion is supported by the assembly because local and remote user's heads can be sensed and then represented to each other with true sight lines. By placing user interface transducers in motion, it becomes possible for users to move as they normally would in group interactions, particularly those including more than two participants. The invention provides a solution that is full duplex and yet has a small footprint. Users can be placed in any arrangement in virtual space. Because lighting and sound generation take place close to the user's head, the invention will not disrupt other activities in the local physical environment. Near-field speaker arrays supply immersive audio and a microphone array senses a users voice. In this way a user can be alerted by an audio event such as a voice to look in the direction of the event. Since the display will move to show what is present in that direction, the display need not be encompassing, or restrict access to the local physical environment, in order for the user to benefit from immersive virtual environments. The invention is also a haptic interface device; a user can grab the display/sensor array and move it about. The invention acts as a planar selection device for 3D data. This is important for volumetric data, such as MRI scan data. The physical position and orientation of display assembly provides planar selection and the need for mental rotation is reduced. Planar force feedback can also be used to allow a user to feel the center of density within a scalar field as resistance and curl. Users see not only each other through display windows, but can also see the positions and orientations of each others' planar selections of shared 3D models or data, so area of interest is communicated with minimal effort. The invention can also be used to subsume or simulate other user interface designs, such as command control rooms with multiple displays, wall-sized displays, "videobots," or conventional desktop PC displays.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention, which can also be called a Compact, Collaborative, Desktop, Explorer (COCODEX), is a user interface technology that can provide a solution to some of the most important and longest standing problems in Virtual Reality, Tele-immersion, 3D visualization, and video teleconferencing technologies. The invention includes an assembly of display and sensor components mounted on a mechanical arm that allows the assembly to move to a wide variety of locations around a user's head. Because the display and sensors are mobile, it is possible to keep them within constrained positions or tolerances relative to the user's face or head as the user looks around, thus making a variety of functions reliable that are not reliable in other configurations. These include auto-stereo display effects, 3D audio without headphones, machine vision analysis of the user's face, illumination of the face, audio sensing of the voice, and so on. This can be accomplished without physical contact with or obscuring of the face, so it becomes possible to accurately accomplish full duplex tele-immersion or other visual communications involving the face. The invention is a full duplex solution for tele-immersion or visual teleconferencing that allows for varied numbers and virtual arrangements of participants, makes demands of sensor and display technologies that can be met using known techniques and materials, and has a practical footprint for widespread deployment. The invention can be thought of as the halfway point in a design continuum between head mounted displays and CAVE-like room displays, while offering significant advantages that neither extreme can offer.

Figure 1:
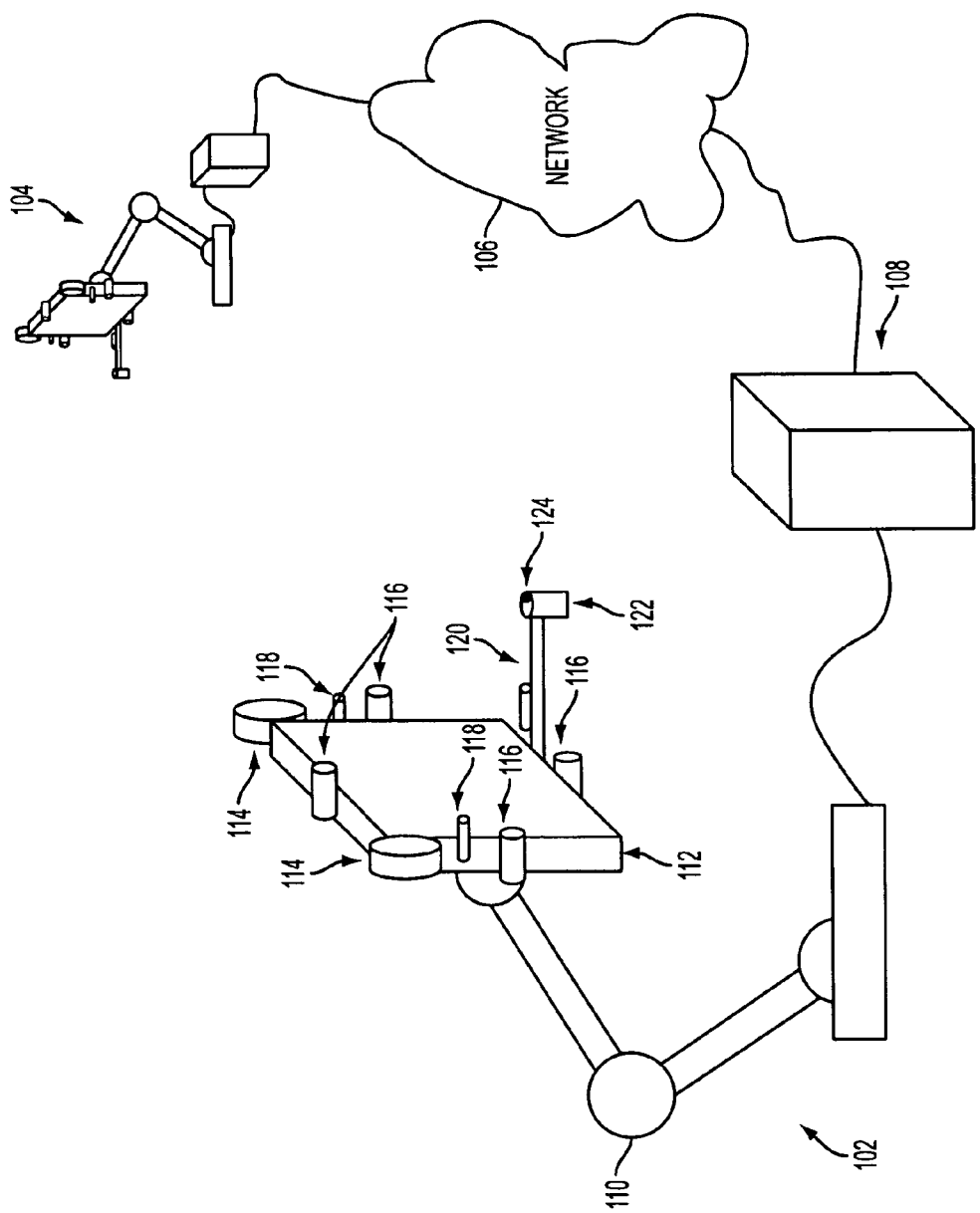
FIG. 1 illustrates the components of a system according to the present invention.

As depicted in FIG. 1, the hardware of the system of an embodiment includes two or more systems (local 102 and remote 104) connected by a full duplex communications network 106, such as the Internet. Each system includes a computer 108 connected to a computer controlled robotics arm 110. The arm 110 is a conventional robotics arm that has multiple degrees of freedom (with effectively 6 degrees of freedom in the end attachment) allowing the display to tilt, swivel, move up, down, away, toward, right, left, etc. The arm also includes the conventional feedback systems that indicate the position and attitude of the arm so that the direction that the display is "facing" is known. The arm 110 holds a visual display 112, such as a flat panel display, to which are attached (an array of) audio speakers 114, visual sensors 116, illumination sources 118 such as LEDs, and an audio sensor 120, such as a microphone array allowing sound direction to be determined. The flat panel display can include autostereo viewing capability by using suitable devices, such as a lenticular screen, through which the images are projected to the user. The display provides a view into the scene that can be adjusted. The autostereo view capability allows the user to see stereo cues in the virtual scene. The speakers and sensors are positioned around the display so that three-dimensional (3D) effects can be obtained and projected. For example, the visual sensors, as will be discussed later herein, are used to sense the position of a user's head and the near field speakers can be used to present to the user a stereo audio image that approximates a position of a participant that appears on the display 112 while at the same time not projecting the sound too far from the physical space of the user. A handle 122 for manual control of the positioning of the display (and the view of the object) is also provided and includes one or more buttons 124 (like the buttons of a conventional mouse I/O device) or interface elements (such as roller balls, thumb wheels, jog wheels) allowing different types of control and selection. For example, buttons and a roller ball can be used to select and activate graphical user interface (GUI) elements that appear on the display, such as a typical menu or GUI icon based desktop. These robotic arm feedback systems can provide manual resistance to movement of the handle as controlled by the computer to allow the user to "feel" the data through which a view or cut-plane is traveling. The components 112-120 and 124 are conventional components, such as video cameras, microphones, etc and are coupled to the computer 108 through conventional interfaces suitable to the components.

Figure 2:
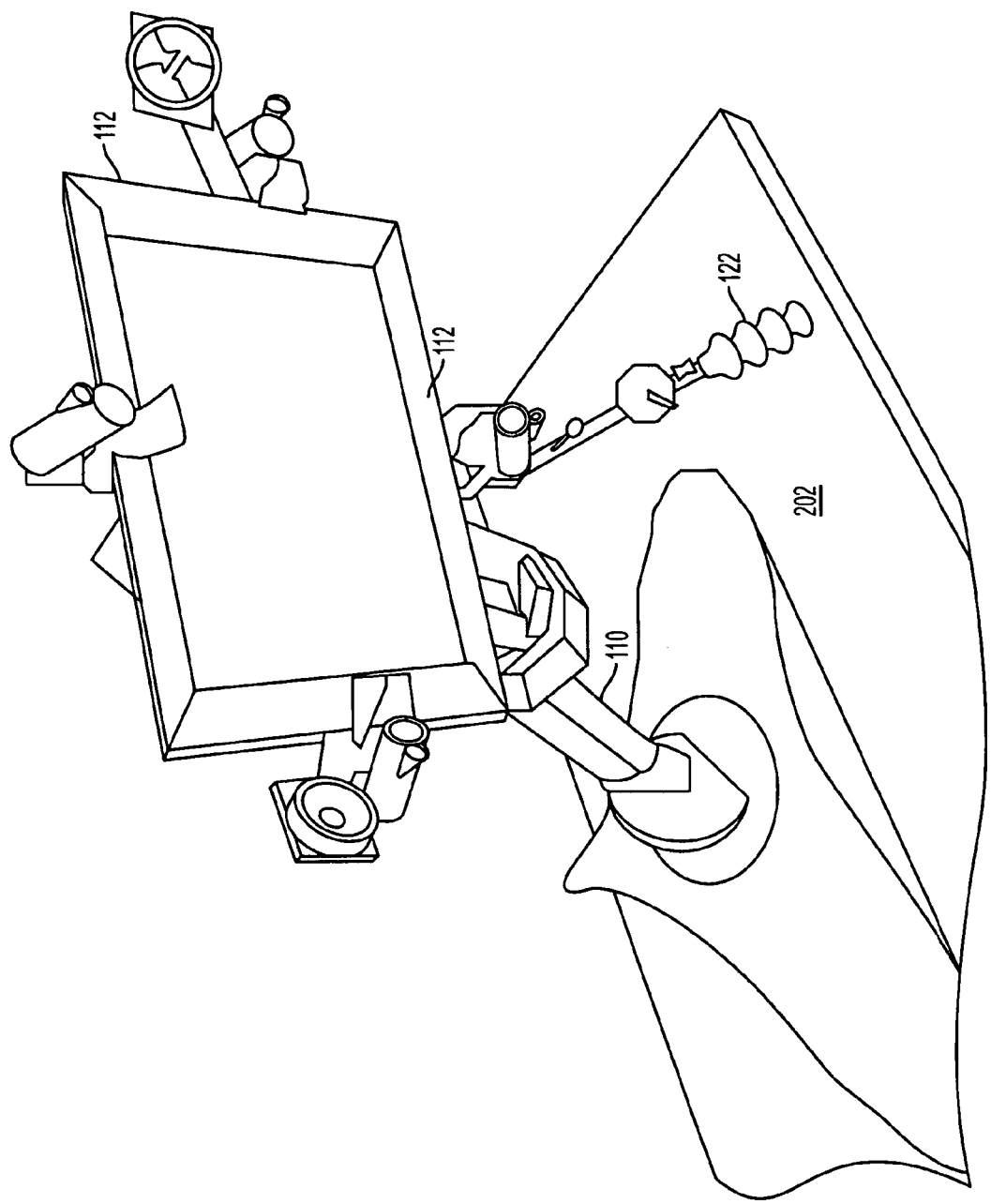
FIG. 2 shows a perspective view of the desktop embodiment.

FIG. 2 depicts a perspective view of a preferred embodiment of the desktop portion of the interface system. In this view it can be seen that the display 112 with its attachments can be moved about above the desktop 202 by the user with the handle 122 or the motors of the robotics arm 110.

Figure 3:
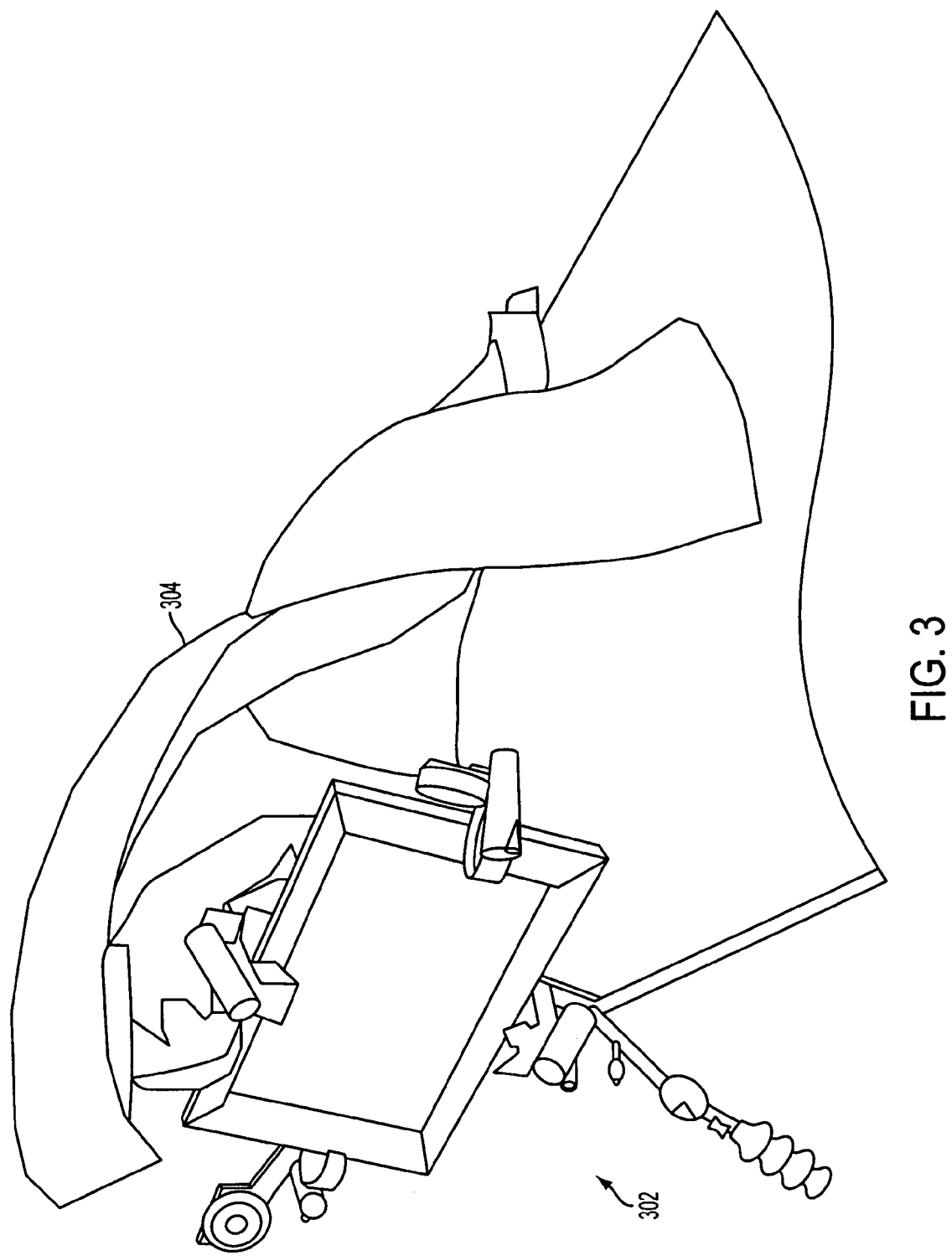
FIG. 3 depicts a hanging embodiment.

FIG. 3 depicts an alternate embodiment where the display assembly 302 hangs from an overarching gantry type device 304. In this embodiment the freedom of movement is greater, allowing the user more views into the "space" that is being presented to the user. For example, in this version the screen can be turned to allow a 360-degree view in both the vertical and horizontal directions, like looking around in a room full of people or even looking about in a theater.

Figure 4:
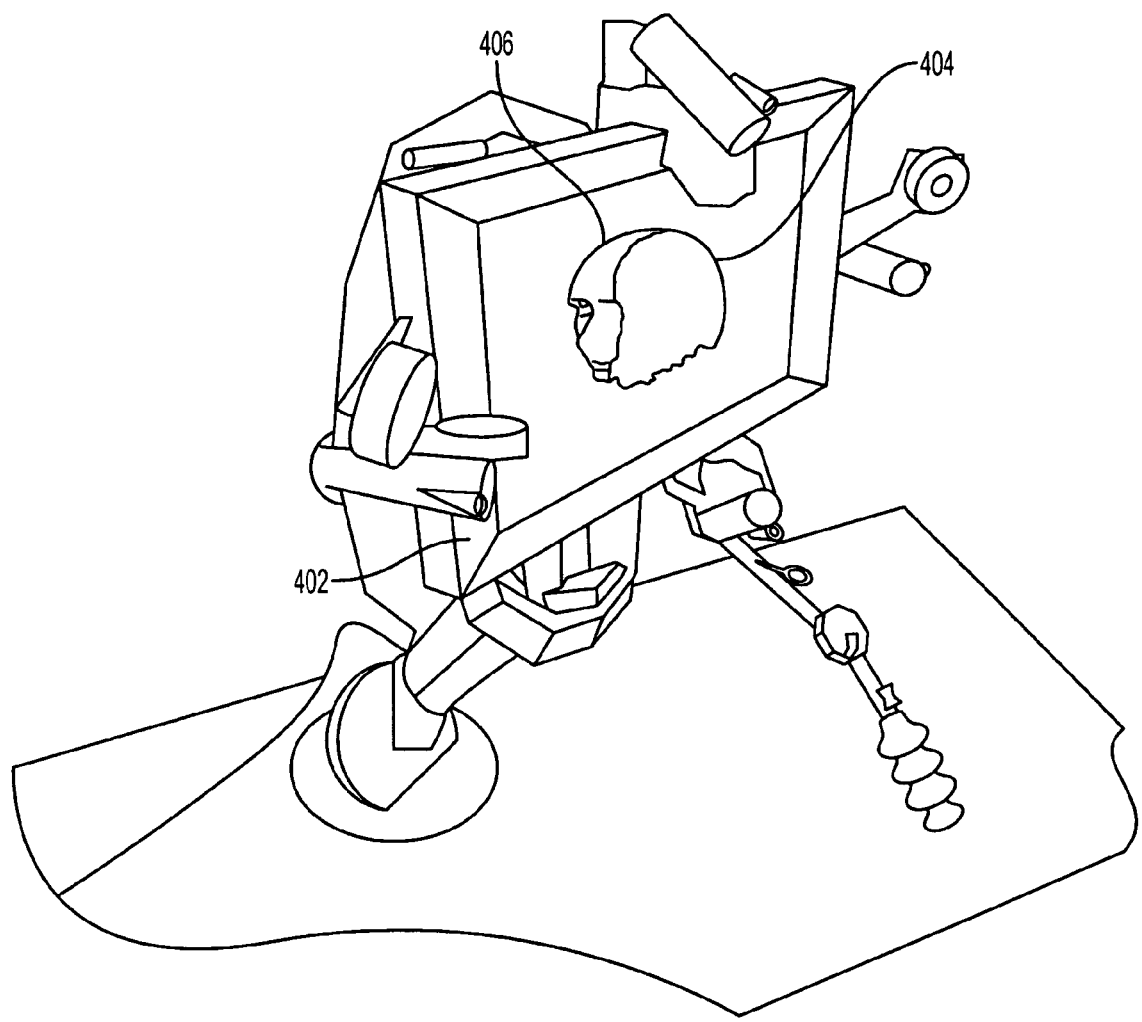
FIG. 4 shows a display according to the present invention.

The freedom of movement of the display of the present invention essentially allows the user to move about and look about in a view space. As a result, the user can take a viewing frustum and move it "through" a virtual object that is being commonly displayed to the interactive collaborating participants. FIG. 4 illustrates the display 402 in such a position where a cut plane 404 through a 3D object 406 (a head of a person) is being displayed.

Figure 5:
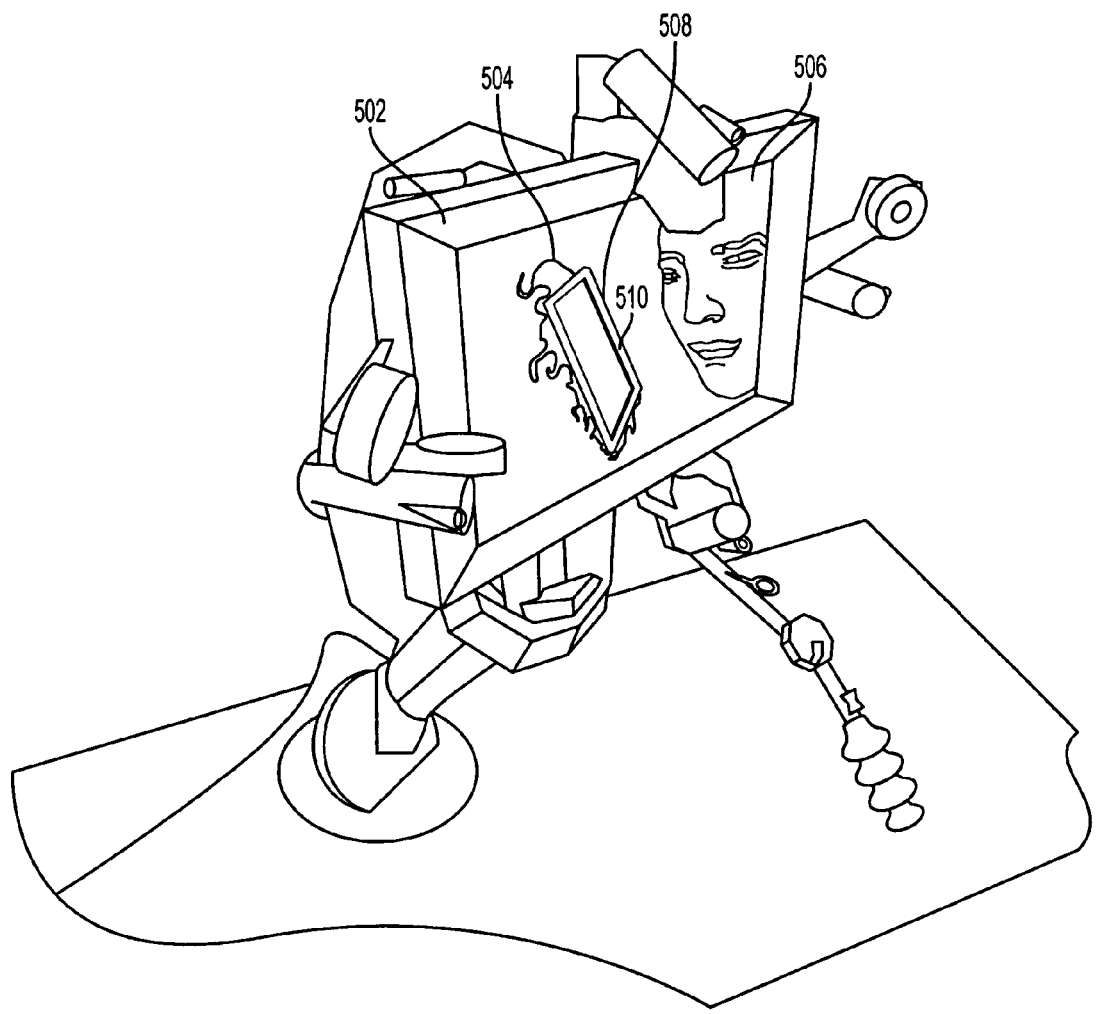
FIG. 5 illustrates how other users and their viewpoint can be shown.

Because in a situation where many individually may be involved in the collaboration, it may be important for each viewer of a common scene to have an understanding of at where the other viewers are looking. FIG. 5 depicts a display view 502 showing a 3D object 504 being commonly viewed by another viewer 506. The other viewer 506 is being shown along with orientation of the other viewer, the cut plane 508 (or 3D object view) being viewed by the other viewer 506 and the other viewers viewing frustum 510. The other viewer is displayed as a compound portraiture image of the face. A compound portraiture image is an image of a user that is constructed using the best data that can be obtained from sensors placed in advantageous positions by the motion of the robotic arm. It is composed of a polygon mesh head deformed by facial landmarks that are tracked by machine vision algorithms (in order to reflect facial expression or pose), to which textures are applied. The textures are of varying resolution, and are derived differentially from cameras in the camera array, so that the best-placed camera contributes most to given area of texture on the head. Variably-transparent mesh objects extend from the head so that objects that extend substantially from the face, such as large hairstyles or hats, can be rendered so as to fade into the surrounding environment with an ambiguous border.

Figure 6:
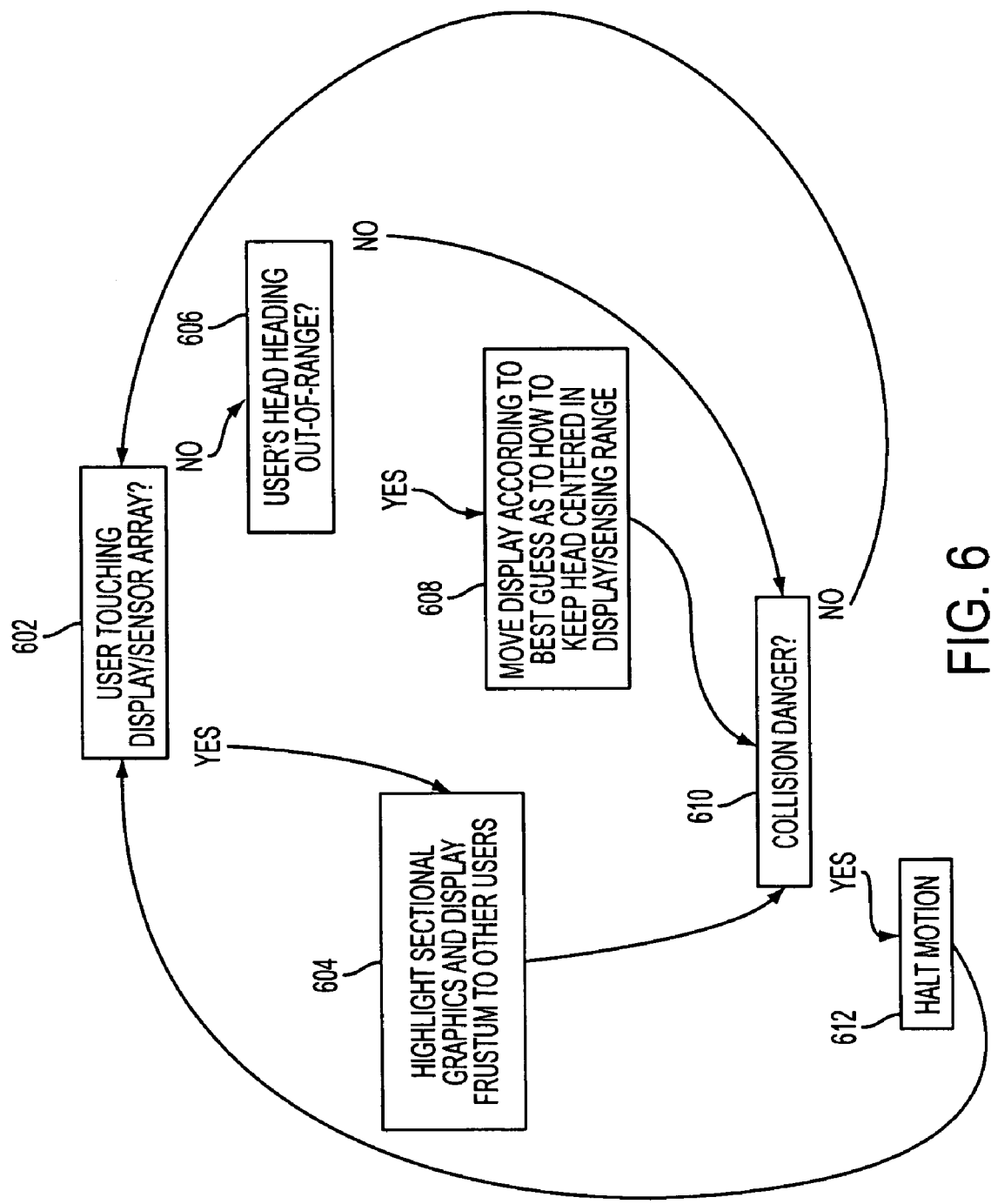
FIG. 6 depicts a master control loop.

FIG. 6 depicts a master flow of control within the computer system 108. A more detailed description of the flow can be found in the attached pseudocode appendix, which can be used to for implementing the system in a preferred language such as C++. In this flow, the system determines 602 whether the handle of the assembly is being touched. This determination can be made conventionally by, for example, using touch sensors on the handle. If so, the system determines 604 the view, viewing angle, frustum, etc. of the viewer and communicates such to the other systems so that they can depict to the other users the view of the viewer moving the display (see FIG. 8). In this way, the other users can be alerted to what the viewer desires to point out, etc. The system also moves the assembly and adjusts the local view based on the inputs from the handle. If the user is not touching the control handle, the system determines 606 the head position and eye view using conventional eye tracking and object motion detection procedures and moves 608 the display to keep the head in the display stereo view/sound range and the sensor sensing range using conventional position prediction techniques. The display is moved by conventionally controlling the robotic arm 110 based on a desired position determined by the position prediction. As the display is automatically moved, the system also determines 610 whether the display will collide with other objects on the desktop, such as another computer, a telephone, etc. This collision detection is also performed in a conventional manner. If a collision is imminent, the motion is stopped 612. The eye tracking also determines when the user is no longer looking at items that are deemed important within the virtual world display, such as when the user glances at an object in the local environment or room, such as a piece of paper laying on the desk top or at another computer display elsewhere in the room. When the system determines that the user is not looking at a defined area of interest within the virtual world depicted in the display, head tracking and motion of the assembly by the robotic arm stops.

Figure 7:
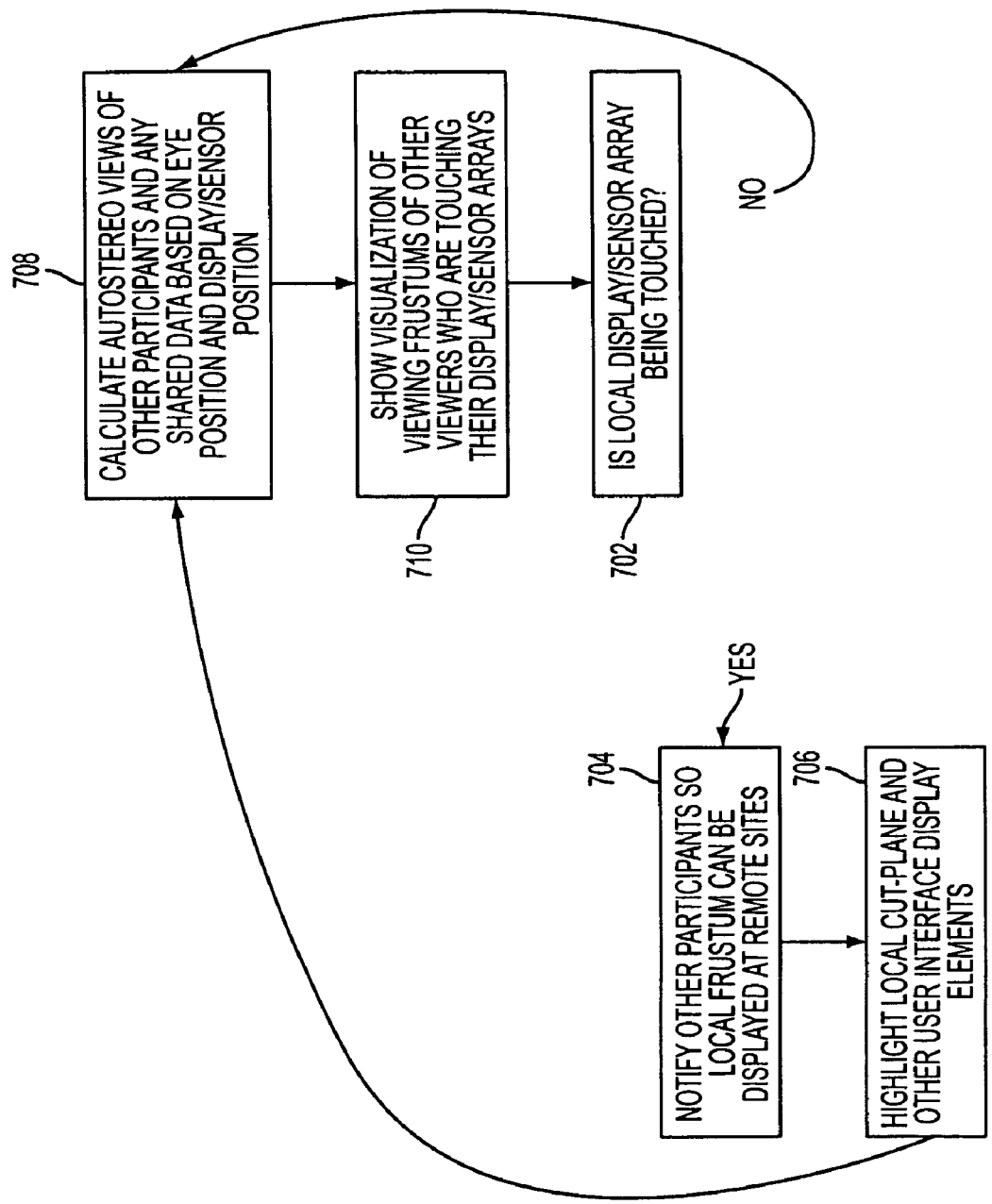
FIG. 7 shows a manual control loop.

FIG. 7 depicts the flow of operations of the system while the handle of the assembly is being touched. A more detailed description of the flow can be found in the attached pseudocode appendix, which can be used for implementing the system in a preferred language such as C++. If the handle is being touched 702, the viewing frustum is determined 704 and communicated to the other systems. In addition, the local cut plane is highlighted 706, along with other user interface elements, such as orientation reference guides and this information is also communicated to the other users systems. When this communication is finished, the system calculates 708 the stereo views of other users along with shared view information and projects 710 an integrated view to the viewer.

Figure 8:
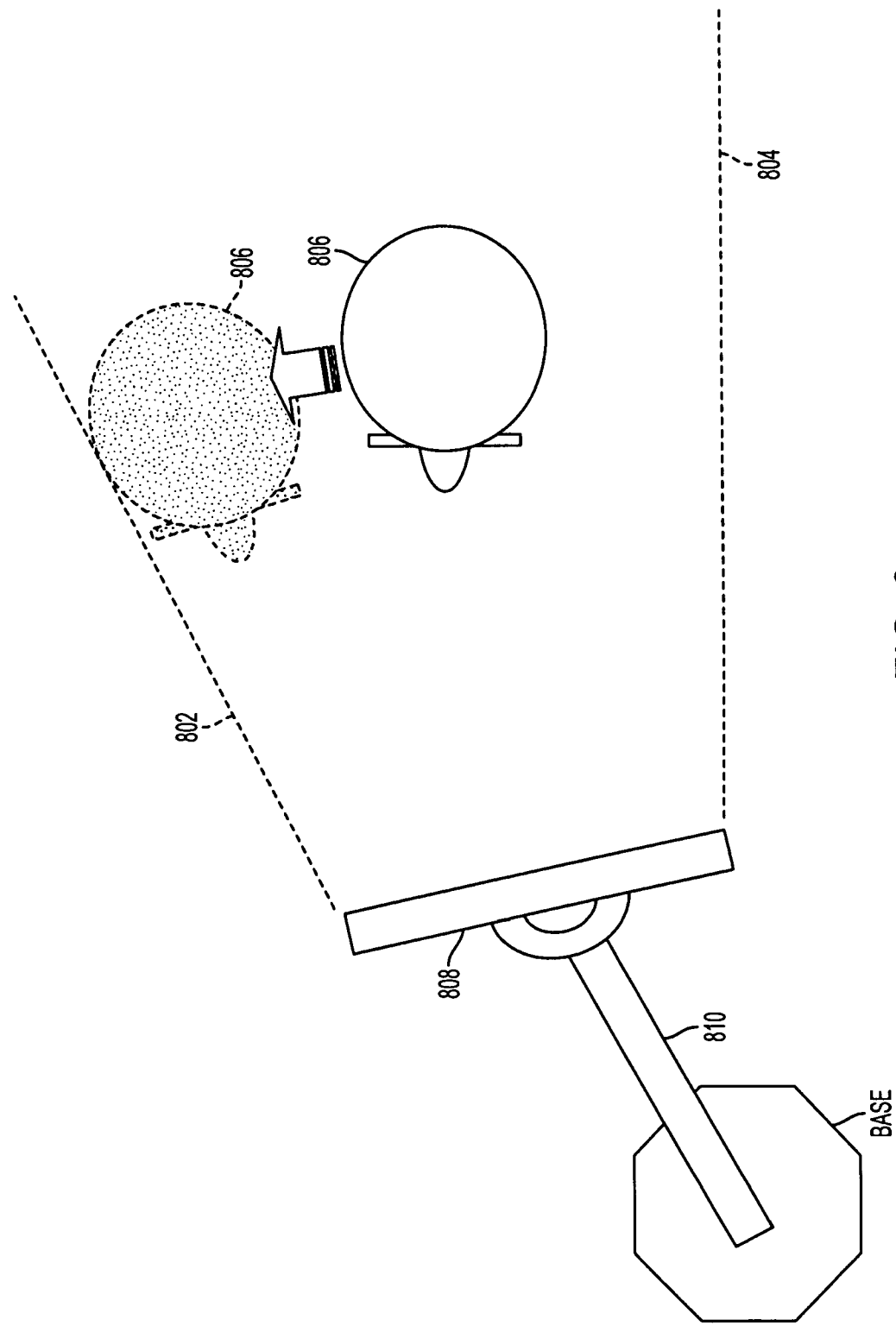
FIG. 8 depicts head tracking and range limits.

FIG. 8 depicts horizontal limits 802, 804 of head 806 motion relative to the display/sensor array 808 for head position sensing and the robotic arm 810. As the head 806 approaches and reaches the limit 802, the system predicts the limit encounter and moves the arm 810 and/or swivels the display/sensor array 808. The position of the eyes relative to the display/sensor array are used to help determine whether the display 808 needed to be swiveled (or tilted). The limits are typically specified by the optics of the stereo view system being used for image projection. The viewing geometry of a particular lenticular or other autostereo screen being used for the display is used to set such limits.

Figure 9:
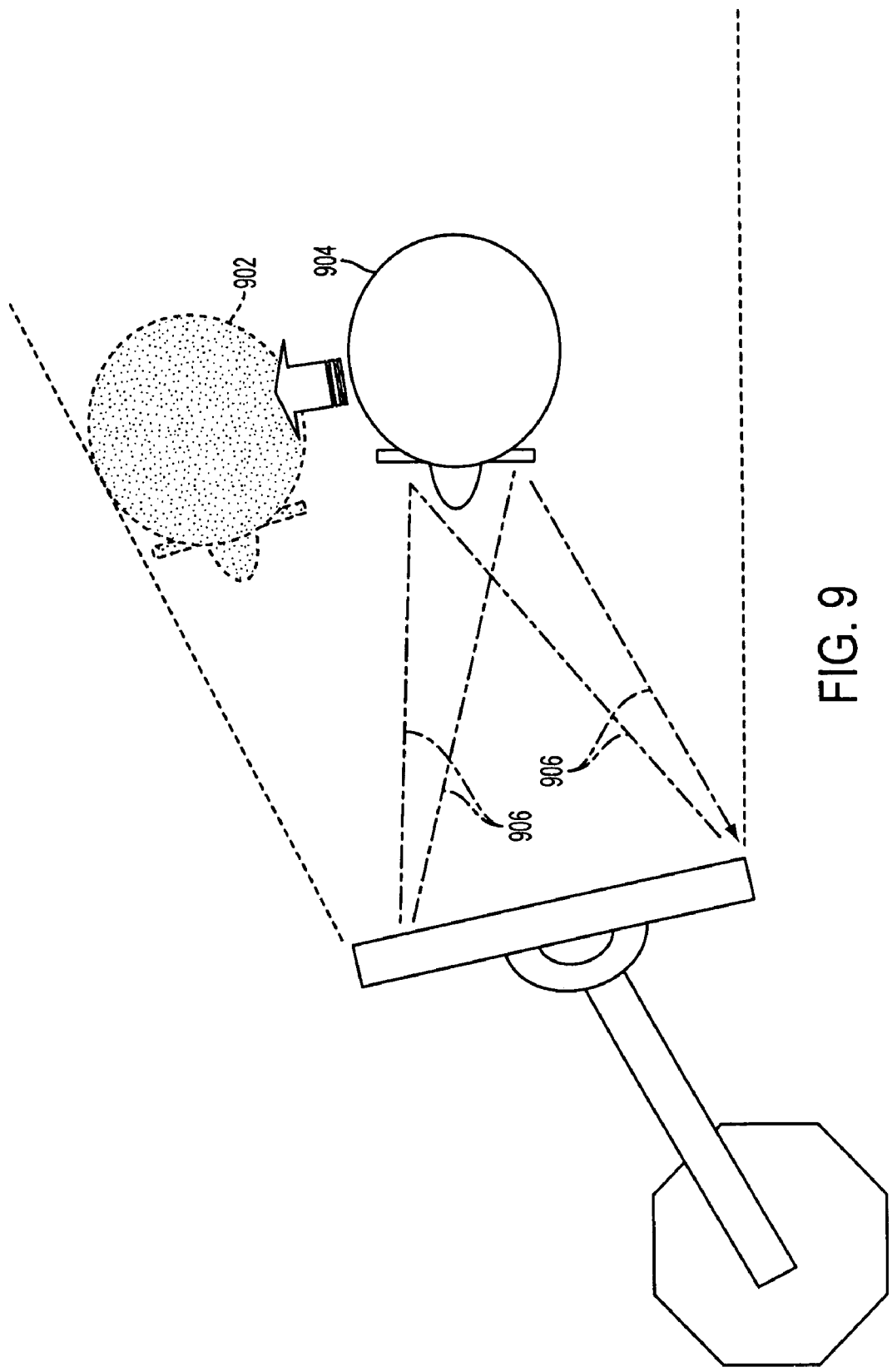
FIG. 9 illustrates eye tracking and head tracking.

FIG. 9 depicts the system making a predictive guess of a future or derived head position 902 of a moving head 904 using conventional eye tracking 906 and Kalman filter based prediction of future position.

Figure 10:
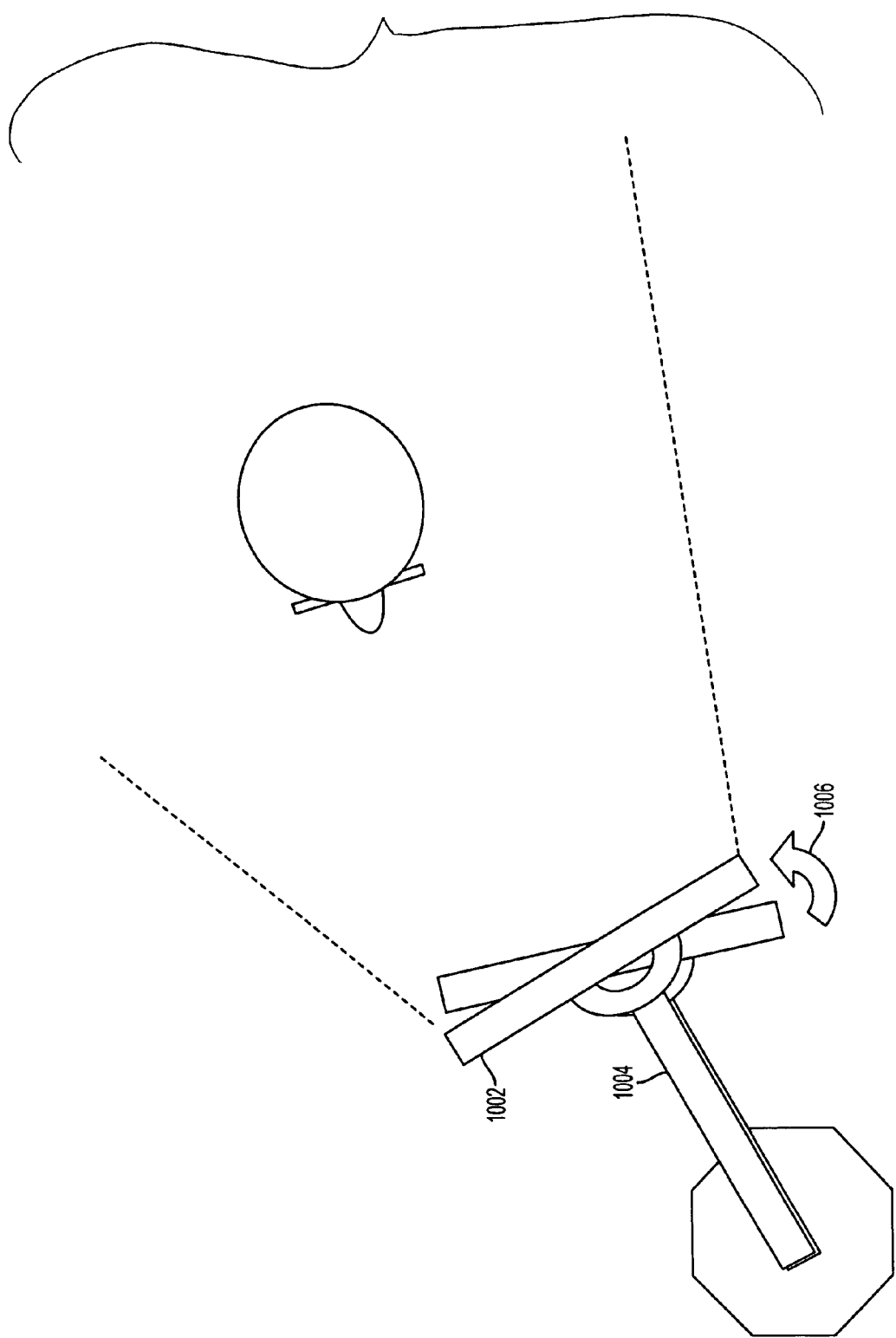
FIG. 10 shows display centering within a desired range.

FIG. 10 shows how the display assembly 1002 on the end of the robotic arm 1004 is automatically moved or swiveled 1006 to maintain the head in a desired center of the viewing/sensing range rather than by moving the arm.

Figure 11:
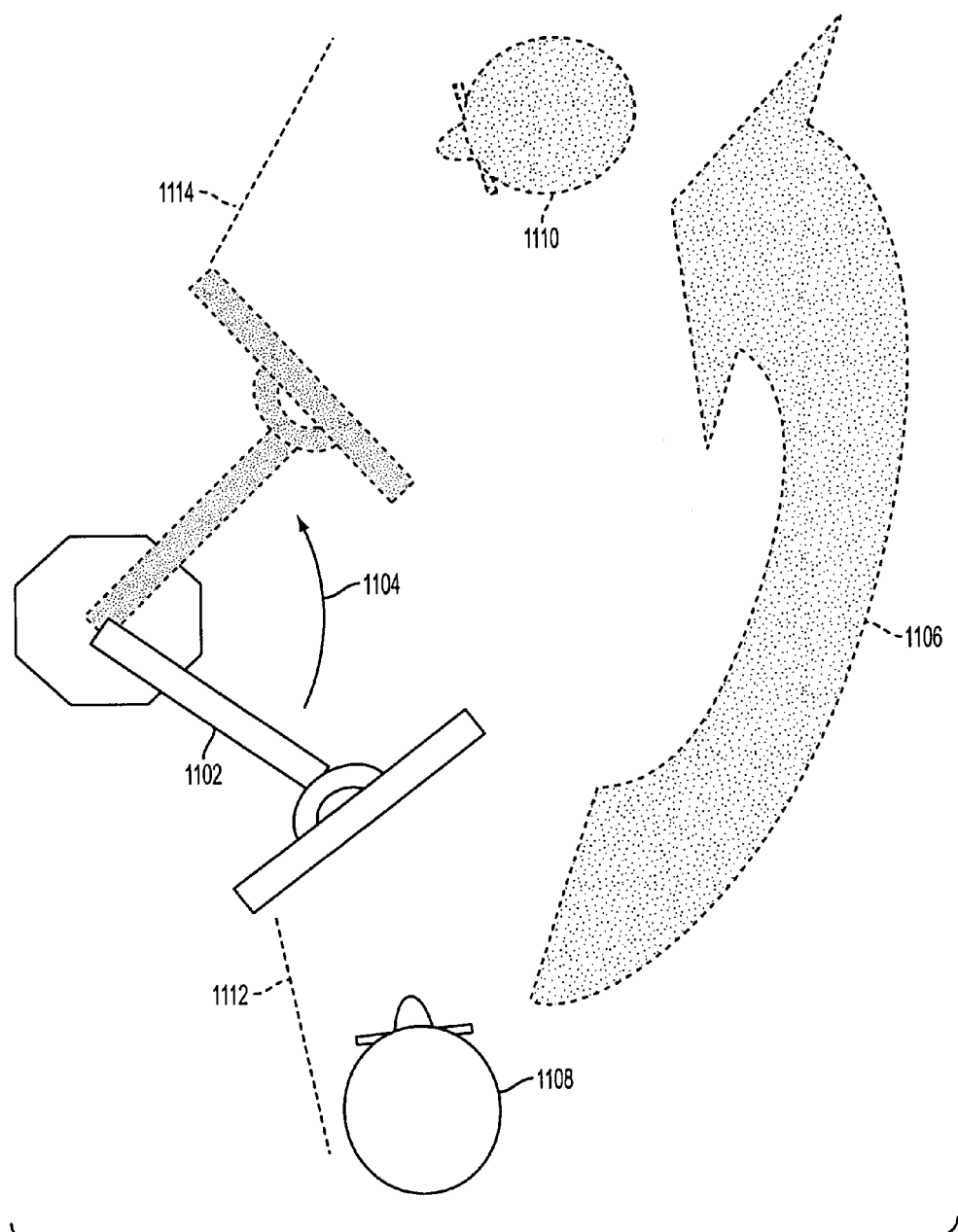
FIG. 11 shows robotic arm movement as head motion is extended.

FIG. 11 shows how the arm 1102 is automatically moved 1104 to provide an extended range 1006 of head motion where the user moves his head from a first position 1108 to a second position 1110 while the system keeps the viewers head with the left 1112 and right 1114 limits. FIG. 11 also shows a situation where the user may be looking at a backside of a 3D object or scene being displayed in the first position 1108 and the front/left side of the object in the second position 1110. With this automatic movement capability and the ability to view the scene within a viewing range, the users can now look at each other as well as at different portions of the object.

Figure 12:
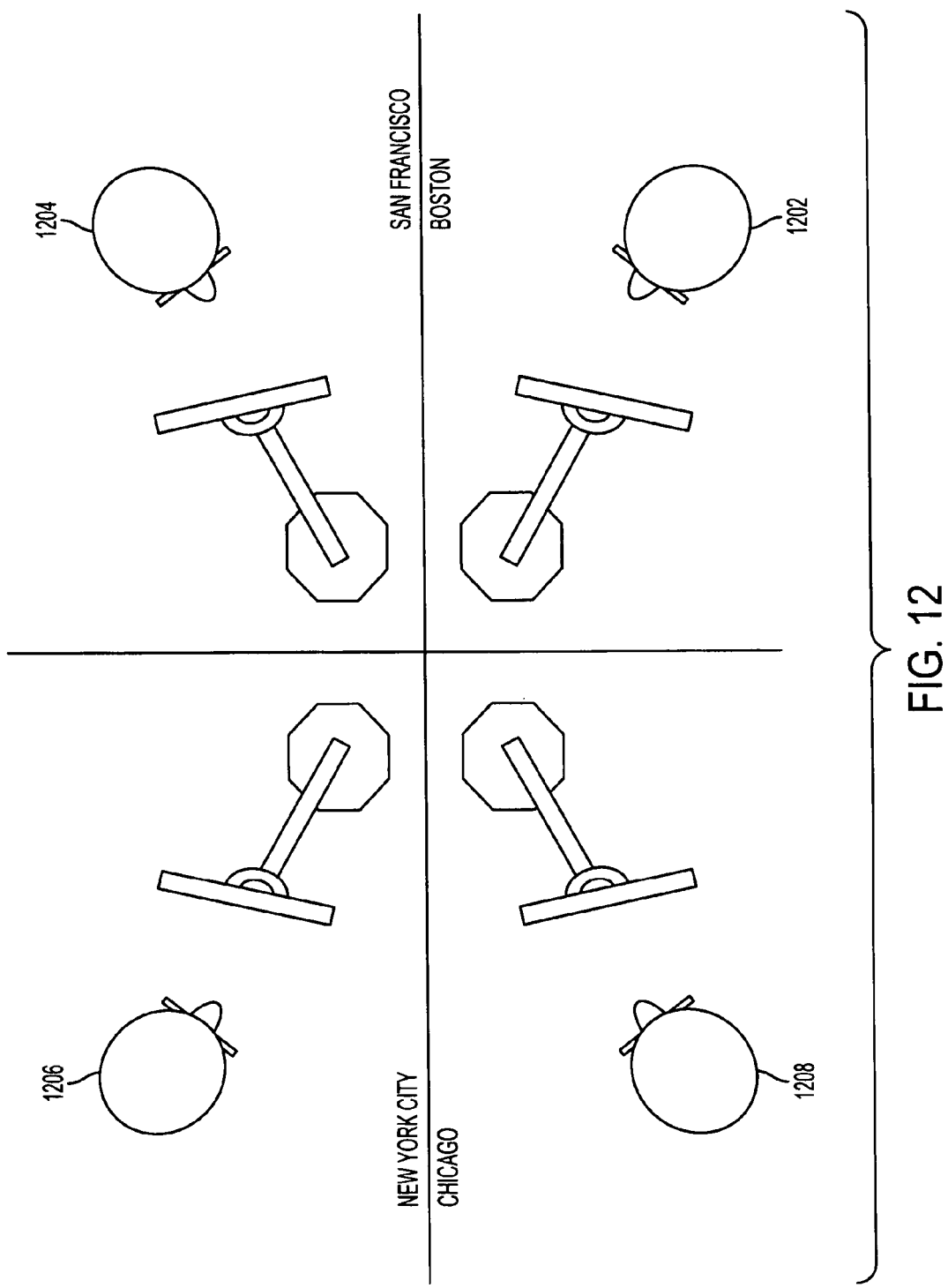
FIG. 12 shows multiple users and their ability to see each other.

FIG. 12 shows how several viewers in different locations can move their heads 1202-1208 while using the system and view others in the group as well as other parts of the common 3D scene during a collaboration. The users 1202-1208 have moved their heads within the head position tracking limits while their eyes have moved to look obliquely through the displays. The system tracks the eye movements of the users 1202-1208 and adjusts their view into the scene accordingly. The relative spatial positions of the users can defined with great flexibility. User's can be close to each other or far from one another, and can be seated equally around a table or gathered in an audience in front of a user who is giving a lecture.

Figure 13:
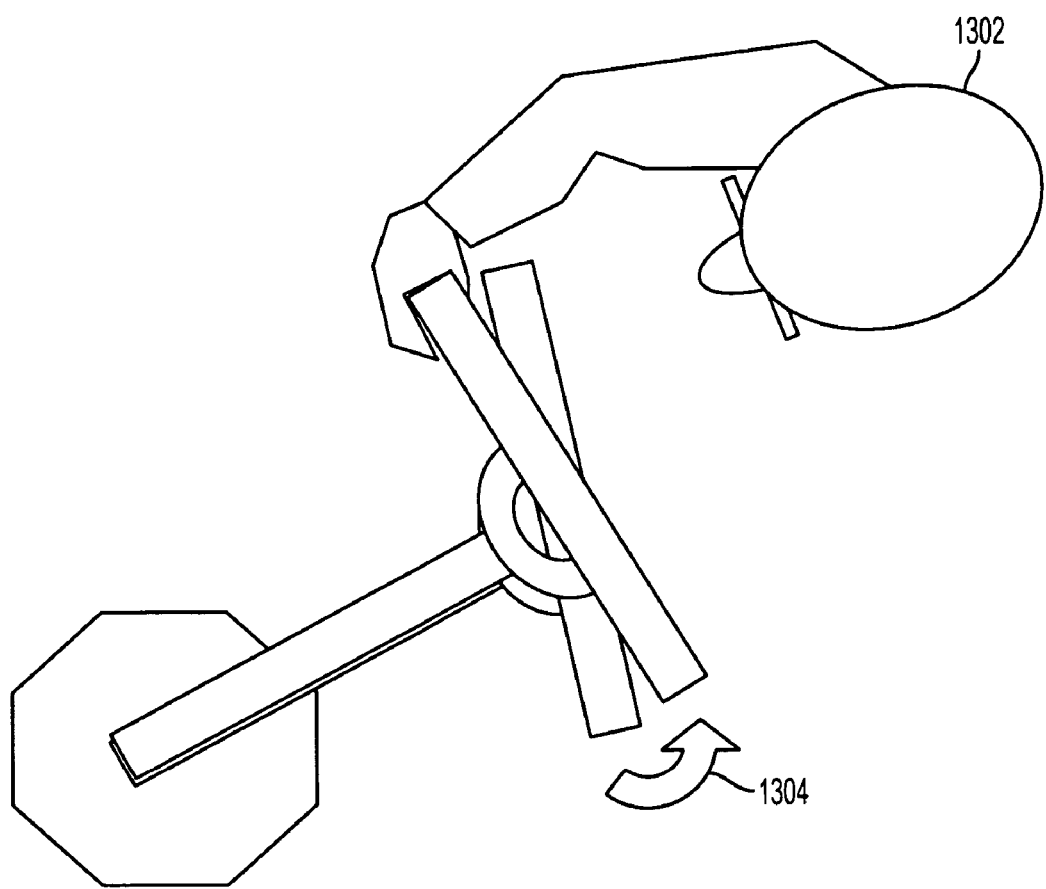
FIG. 13 shows manual movement of the display assembly.

FIG. 13 depicts a user 1302 manually moving 1304 the display to look at a particular party of the scene or at another user by grabbing a side of the display assembly. This particular example of motion control does not use the handle and relies on the feedback from the position sensors in the robotic arm and display assembly head to make adjustment to the display view, etc.

The above-discussed figures show the user moving essentially horizontally, the system tracking the user and moving the display accordingly. The system is also capable of moving the display vertically and at angles.

The present invention also uses the conventional virtual reality capabilities that allow a user to view a 3D scene from multiple changing perspectives and that allow other views, such as a view of another user, to be combined in the same view space.

Figure 14:
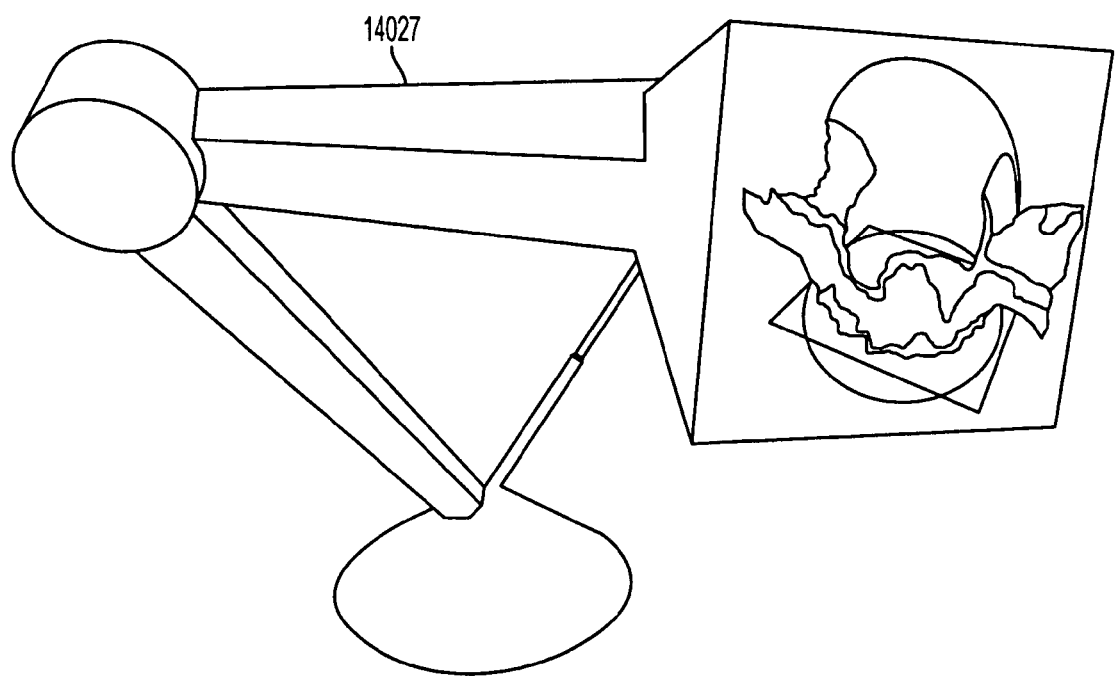
FIGS. 14 and 15 depict a hollow arm embodiment.
Figure 15:
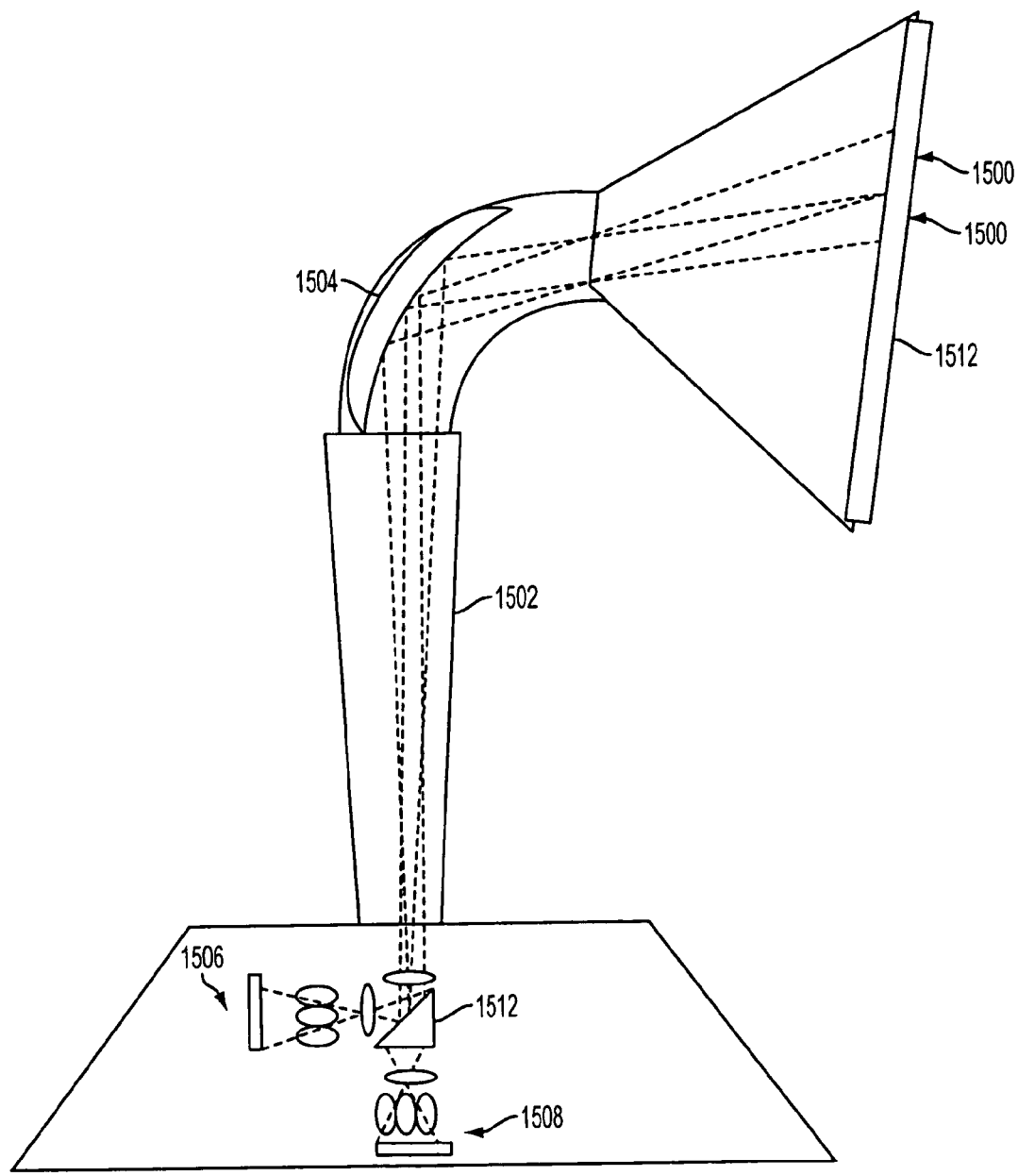

The present invention can incorporate a merged dual-exit pupil display as its display as depicted in FIGS. 14 and 15. There have been varied autostereo displays using multiple exit pupils, but they have either required very large footprints to handle the optics to make large exit pupils, or have demanded an artificially small amount of head motion from the user, so that the user can see small exit pupils. The invention makes smaller exit pupils 1500 usable by moving them to match the user's moving eye positions. In an embodiment, a variation of the arm 1402/1502 is required which is hollow and capable of supporting mirrors 1504 in its joints. One display 1506/1508 for each eye is placed in the base 1510 and combined with a combiner 1512. These are preferably DLP or LCOS micro-displays illuminated by LEDs or other light sources. Powered mirrors are placed in the joints, so that the invention functions like a periscope, incorporating the optical properties of a stereo microscope. A holographic optical element 1512 is one suitable choice for the final powered optical element, coincident with the plane of the sensor/display assembly, in order to reduce weight.

The aspect of the invention of placing sensors and displays in motion to approximately keep track of a user's head provides multiple benefits: a) Improved integration of virtual and physical tools: With the invention it is easy to look into the 3D scene and then out again while seated, allowing users to easily divert attention between people and things depicted in a virtual space and other people and things present in the physical environment. A user can easily use conventional PC tools and immersive virtual world tools in the same work session. b) Emulation of other user interface designs: The invention can emulate a conventional PC display by defining a virtual PC display at a certain position in the virtual world. When the invention's display is moved to the corresponding physical position it effectively acts as a physical simulation of a conventional PC at the same location. Similarly, the invention can be used to emulate command/control centers, display walls, and other user interface designs. c) Improved upper-body mobility for seated users of tele-immersion services: Available eye tracking technologies, which are required both for facial reconstruction and for the control of autostereo renderings, do not track eyes within the full normal range of human head motion during the course of a conversation in which a person might be looking around at multiple remote participants. By coupling eye-tracking sensors to the mobile display that is allowed to move in approximate conjunction with the eyes that are being tracked, sufficient performance is achieved to support a multi-person conversation with diverse relative positions of participants. The same argument is generalized to all visual sensors. A single camera pointed straight at a user is a common design in visual telecommunications, but this design fails to meet human factors requirements. Some degree of reconstruction of the user's head/face is needed to meet these requirements, so that accurate lines of sight can be supported, with each user appearing to the others at the proper perspective angle. Machine vision techniques and cameras have not performed well enough to achieve this when limited to fixed viewing positions, given normal human ranges of motion. Since with this invention cameras keep up with the face, existing cameras and machine vision algorithms can sense a user's face well enough for perspective alteration and other tasks. d) Improve the performance of autostereo displays: The invention enables rendering of precise points of view within autostereo displays and prevents users from seeing nil, pseudoscopic, or otherwise incorrect image pairs, even while supporting a full range of head motion. e) Improved independence of physical and virtual space allocation: The physical arrangement of displays in previous tele-immersion setups placed constraints on virtual participant arrangements. For instance, in order for a user to be able to see remote users to the left and to the right at a virtual table, there had to be local physical displays to the left and right to support sight lines to view those remote users. If a tele-immersive meeting using fixed displays has more than a few participants, the display requirements become expensive and impractical. The invention's single mobile display allows users to look in any direction and, thus, it foresees any number or arrangement of remote participants with only a modest and fixed requirement for local physical space. f) Improved exploration of volumetric data: With the present invention, by equating physical display position and orientation with virtual viewing frustum, the user's brain is relieved from having to perform a 6D transformation that confuses many users in typical immersive systems. This is significant in medical and scientific applications involving selecting sectional views of volumetric data. g) Improved user interface for implicit communication of interest and activity between users: With the invention, users can see renderings of the locations and projective contents of the mobile screens other participants are viewing the world though, so each user can tell what the others are paying attention to. Since the invention makes it easy to perform planar selections and manipulations in addition to point-based ones, it is easy to design visualizations of what other participants are doing. Users see both the heads of other users, the screens they are using, and the ways that those screens are coupled to virtual objects that are being transformed. h) Reduced impact on the local shared physical environment: The invention can be desk-mounted and doesn't require low light conditions. i) Improved sound system for collaboration in a shared physical facility: Headphones excel at 3D audio effects, while speakers, though convenient, don't produce these effects well when placed at conventional distances, despite a great deal of effort by many labs to get them to do so. Speakers can also be loud when placed conventionally and this can disturb others in a work environment. By coupling near-field speakers approximately to head position, the invention provides 3D sound at low volumes without head contact and without demanding any time to get into or out of the interface. A similar issue exists with microphones. A mobile microphone or microphone array will pick up the voice more consistently. j) Improved integration of audio, haptic, and visual user interface modalities: The invention can be used for planar exploration of a scalar or vector volumetric field- or even one with curl. The user interface of exploration using any of the three above sensory modalities is identical (moving the display), and this tight integration will make it easier to train and collaborate with users who have certain disabilities. That is to say, a blind user and a deaf user could each explore a virtual object in similar ways, and thus collaborate more effectively. For the blind user, a haptic display, as described in detail in the pseudocode below, will be available, in addition to an audio display. For instance, the center of density, as calculated to provide haptic feedback of the location of a tumor in the pseudocode below, could also be used as the source of a virtual sound source using conventional 3D sound rendering techniques.

As can be seen from the above discussion and the attached drawings, the present invention solves a number of problems related to positions of sensors and displays. The invention provides autostereo without constraining user position unacceptably, provides headphone-like 3D audio performance without headphones, performs visual facial sensing without constraining user position unacceptably, provides consistent illumination of the user's face, isolates the user's voice without constraining user position unacceptably, provides a compact desktop implementation, facilitates instant-in-and-out, easy overall workflow when used in conjunction with other user interfaces, easily depicts what other users are paying attention to and doing, and provides 6 degrees of freedom of the physical display and the virtual viewing frustum, which are equivalent, making it easier for users to understand six degree of freedom navigation.

Other techniques can be used for head position and orientation sensing. For example, a 3D magnetic field based sensor system, such as Polhemus sensor and sensor system available from Polhemus, Colchester, Vt., can be worn on the user's head. These sensors can also be used to warn the user to manually move the display with the attached sensors when the user's head position is reaching a limit.

The invention arm can be mounted on a floor-standing pedestal, or a rolling such pedestal. The arm can be ceiling-mounted. The arm can be mounted on a powered mobile base, so that the base moves on a table or other surface in addition to the other motions described above. A mobile floor-mounted base can be incorporated to make the invention functional for a walking user.

The display/sensor assembly can be hand-supported, if position and orientation are sensed using sensors such as those described above which do not require a rigid mechanical linkage. The display/sensor assembly can be hand-supported and wireless, using protocols, such as Bluetooth, to connect all components with computation resources.

The arm can be mechanically supported, but manually moved.

The invention display can be a transparent or semi-transparent surface that can present to the user superimposed projected images over the physical scene which is visible beyond the display surface. In this case, the invention incorporates the functionality of "Augmented Reality" displays (which are well known). When an "Augmented Reality" type display is chosen, the arm can be mounted on the inside surface of a vehicle. This can be done to provide simulated presence of other passengers in the vehicle, such as flight instructors (in the case of an aircraft). Another example of this variation is a set of commuter trains with invention systems present in each train, so that passengers on different trains could simulate being on the same train at once in order to have a meeting while commuting.

The arm can be supported by the human body through a mounting system that attaches to a helmet, or directly to the human head, shoulders, and/or waist. When attached to the head, the invention resembles a head-mounted display, but is unlike other head-mounted displays in that a) there is sufficient clearance from the face for facial sensing to support tele-immersion, and b) small amounts of motion of the display relative to the head are acceptable because the techniques described throughout this patent compensate for them.

The screen and other components can be mounted on the mechanical arm using clips or clamps or other easily disengaged fasteners. This facilitates rapid changing of the choice of components present in the invention. For instance, a user can switch between autostereo and higher resolution non-stereo displays.

The invention can be constructed as a product that includes the arm and the software described in the pseudocode below, with each user adding sensing and display components according to individual preferences.

The invention can incorporate a conventional computer display, mounted on the reverse side of the autostereo display, facing in the opposite direction. When the user is performing conventional computer tasks, the arm swivels the display/sensor assembly so that the conventional display is facing the user, and when the user wishes to perform tasks suitable for the invention, the assembly is turned so that the autostereo display is facing the user. The turning action (which switches from an autostereo to a conventional display) can be triggered when the user moves the assembly so that it is coincident with the placement of a simulated conventional computer display in the virtual space.

The invention can incorporate a front or rear projection screen as its display, where the display surface is in motion, but the light source is either stationary or in motion to a lesser degree. In this case the projected image must be directed and distorted to correct for the changing relative placements of the light source and the projection surface, which can be accomplished by various established means, such as moving mirror and lens systems and computer graphic techniques for simulated optical anti-distortion.

The invention can incorporate a screen element which, rather than being flat, as described above, is concave, in order to provide the user with an effectively wider-angle display.

A subset of the components described as being mounted on the arm can instead be mounted separately on a stationary or less mobile platform. For instance, a stationary light source can be substituted for the mobile light sources preferred in this description, or a stationary audio sensing or display system can be substituted.

The invention can incorporate only a subset of the displays or sensors described in the preferred embodiment. For instance, a silent version might incorporate only the visual components, and none of the audio ones.

A barrier can be incorporated which surrounds the space to the rear of all the positions the arm and the display/sensor assembly can attain, with sufficient clearance for operation, but which is open in front to give the user access to the device. This is an alternative or enhancement to relying on collision detection and prevention subsystems to prevent collisions between the arm or assembly and people or objects in an environment. An embodiment of this barrier is an approximate section of a sphere in shape, transparent and composed of a lightweight material like plastic. The barrier can be made in several sections that can be attached or detached to facilitate transport.

The mobile portions of the invention can be made largely of low-weight, soft materials. For instance the display screen can be a soft rear-projection surface, such as plastic, or a flexible (such as OLED) display. Soft audio speakers are available which are made of piezo and other materials. While soft versions of the sensor components (such as cameras, microphones, and position/orientation sensors) are not available at this time, versions of these components are available which are low weight and small. A version of the invention in which the majority of the mass of the components in motion is comprised of soft, lightweight materials will have reduced requirements for collision avoidance.

The invention can incorporate additional optical components to provide accommodation relief for certain autostereo displays. That is to say, the distance at which the user's eyes must focus to resolve the stereo images presented in the display can be changed by incorporating these optical elements. A set of lenses, Fresnel lenses, holographic optical components, or other optical devices can be mechanically connected to the invention and positioned appropriately between the user's eyes and the display. It should be pointed out that these optical components typically only function under narrow positioning tolerances, so the same technique that is used to make other invention components function, of having the components move to track the head's location, makes it possible to incorporate such optical elements.

The accommodation relief optical elements described in the previous paragraph can be mounted on a separate arm or a subordinate arm. This is desirable if the positioning tolerances of the optical components are tighter than the display. The same control software described for the display would be applied to the motion of the optical components, but with tighter adjustments for tolerances as described in detail in the pseudocode below.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

Pseudo Code of Invention

Some Key Global Variables

FACEVARS: Most recent measured user's head/eyes Position/Orientation (6D relative to COCODEX base)

FACEFUTURE: Predicted near term user head/eyes Position/Orientations (6D list, path, or similar representation)

CONFIDENCE: indication of how well the user's head is currently being tracked

FACE-PROTOTYPE (which can be generic or user-specific); a labeled graph of 3D points representing typical relative placements of facial landmarks; can be simple geometry, or can incorporate biomechanical modeling.

FACEPOSEFUTURE; A prediction of geometric distortions of FACE-PROTOTYPE (a set of future path predictions corresponding to each point in the graph)

ASSEMVARS: Most recent measured display/sensor assembly Position/Orientation (6D relative to COCODEX base)

ASSEMFUTURE: Predicted near term display/sensor assembly Position/Orientations (6D list, path, or similar representation))

UI-VARS: State of such things as buttons, dials, and other UI conventional UI components mounted on the display/sensor assembly or elsewhere on COCODEX WORKING VOLUME: a volume relative to the Position/Orientation of the display/sensor assembly within which display and sensor functions related to the user's face will work; it is the intersection of the individual volumes in which autostereo visual effects, 3D audio, and the various sensors such as cameras and microphones will have adequate functional access to the user s face.

IDEAL VOLUME: a volume within the WORKING Volume that serves as a safety target for maintaining the relative positions and orientation of the display/sensor assembly to the user's face FACE-TRACKING VECTOR—The change in the Position/Orientation of the display/sensor assembly that is currently projected to keep the user's eyes and the rest of the user's face in the IDEAL VOLUME: (in the event that it would otherwise fall out of the IDEAL VOLUME)

ROBOTIC-MOTION-CALIBRATION-TABLE: A pair of sparsely filled in 3D vector fields; the first contains instructions that have been sent to the particular robotic arm installed locally, and the second contains the resulting move that actually took place.

FORCE-RESISTANCE-VECTOR: Vector indicating one component of haptic feedback control REPULSION-FIELD-VECTOR: Vector indicating another component of haptic feedback control PLANAR Haptic feedback map: A vector field that stores results in advance to speed the calculation of current values for the above vectors USER-APPLIED-FORCE-VECTOR: Vector indicating the force user is applying to the display/sensor assembly by grabbing it (is nil when the display/sensor assembly is not being grabbed)

TELE-LAYOUT of shared virtual environment:
    A data structure including at least:
      Volumetric, polygon-plus-texture, or other 3D representation of local environment, including desk surface, perhaps walls, etc
      Similar representations of remote environments of other users
      Additional virtual elements, such as virtual display walls, command control displays, conventional 2D computer displays to be simulated in the virtual space, and other 3D objects and data displays.
      A seating plan: The relative positions and orientations of all local environments in a merged tele-immersive setting.
      Design elements which merge, hide, or otherwise manage the boundaries of the renderings of local environments that can be seen remotely
      Conventional data associated with online collaborative efforts: List of participants; times when certain meetings are scheduled to start and end, lists of members who can potentially join if they are not already present; information related to quality of network services for each participant; billing or other administrative data AREA OF INTEREST: a volume within a TELE-LAYOUT that contains representations of displays, simulation components, data displays, and other elements that a user might wish to look at COCODEX-AS-AVATAR: a binary mode indicator (End definition of global data structures)

BEGIN MAIN LOOP
  IF a TELE_LAYOUT is NOT selected
  THEN
    CALL FUNCTION SETUP_TELE-LAYOUT
  CALL FUNCTION COCODEX_AUTO_SENSING
  IF Confidence that the user's head is being tracked is high AND COCODEX-AS-AVATAR mode is NOT activated for local unit
  THEN
    CALL FUNCTION KEEP_TRACK_OF_FACE
    CALL FUNCTION KEEP_COCODEX_IN_FRONT_OF_FACE
  ELSE IF Confidence that the user's head is being tracked is low AND COCODEX-AS-AVATAR mode is OFF for local unit
    CALL FUNCTION FACE_NOT_CURRENTLY_TRACKED ELSE IF CODEX-AS-AVATAR mode is ON for local unit
   CALL FUNCTION COCODEX_AS_AVATAR
   CALL FUNCTION COCODEX_HAPTICS
   CALL FUNCTION PREPARE_COMPOUND_PORTRAIT
   CALL FUNCTION COCODEX_NETWORK_COMMUNICATIONS
   CALL FUNCTION UPDATE_LOCAL_VIRTUAL_WORLD
   CALL FUNCTION AUTOSTEREO_RENDERING
   CALL FUNCTION COCODEX_SOUND

END MAIN LOOP

FUNCTION KEEP_COCODEX_IN_FRONT_OF_FACE

COMMENT This function describes the most "characteristic" or central feature of COCODEX. The IDEAL VOLUME is contained within the WORKING VOLUME, so by testing for near term divergence from the IDEAL VOLUME, the head is continuously kept within the WORKING VOLUME. If a set of fast, high quality sensors and displays is used, the two volumes can be almost the same, while low cost sensors require a larger difference between the two volumes. There are, of course, other techniques that can be used instead to express variable tolerances in control software.

Note that in the pseudocode given here, only one local user is assumed. The Eyematic type of facial feature tracking has already been demonstrated to be capable of tracking four local users, however. Some autostereo screens, such as lenticular or parallax barrier displays, can support enough distinct views in an appropriate configuration to support more than a single local user as well. All the code for this and other functions can be easily extended to support multiple local users, provided the display and sensor subsystems can support a sufficiently large IDEAL zone to contain them all at once.

FOR a set of near term points in time
     READ the value predicted for that point in time stored in ASSEMFUTURE
     CALCULATE what the IDEAL VOLUME would be in terms of a coordinate system originating in the COCODEX base for that point in time
     COMPARE with values for same point in time stored in FACEFUTURE
   IF values in FACEFUTURE diverge from predicted values for IDEAL VOLUME
   THEN
     CALCULATE the new arm position that would MOST reduce divergence, centering the predicted IDEAL VOLUME on the predicted FACEVARS
     CALCULATE whether the new viewing frustum, were the arm to be moved as calculated above, would still intersect the current AREA OF INTEREST
     IF the new frustum would still intersect the AREA OF INTEREST
     THEN
       UPDATE FACE-TRACKING VECTOR with a vector that would move a perfectly responsive arm to the new position calculated above

FUNCTION KEEP_TRACK_OF_FACE

COMMENT As was pointed out earlier, currently available sensor subsystems for finding and tracking facial features don't function well enough to support tele-immersion. This is because they only work if the user's face remains within an untenably limited range of positions and orientations. COCODEX fundamentally addresses this problem by putting the subsystems in motion to keep up with the face as it moves. When cost or other considerations result in exceptionally poor subsystem performance, it is sometimes necessary to combine multiple instances of particular sensor subsystems or multiple types of subsystems to gain a level of performance necessary for COCODEX to meet human factors requirements. The particular choices of how to do this are within the range of typical skills in the art, and illustrate how the invention enables and improves such techniques.

The assumed facial feature finding subsystem in this pseudocode is the machine vision-based technology initially described by Eyematic. Another example of a potential subsystem is IBM's Blue Eyes.

Four cameras surrounding the display, each running the Eyematic feature-finding algorithms, are assumed, though the number and placement can vary. Each camera will supply image streams used by software to attempt to find a set of facial features. The varied placement will result in the cameras having access to different subsets of the face. For instance, a camera looking at the face from the left might not detect position of the right nostril because the nose will be in the way. While this might sound humorous, it's actually a serious problem in face tracking. Another common problem is a user's hand temporarily obscuring a portion of the face from the point of view of one camera, but not all cameras at once. This function performs specialized sensor fusion to address that class of problem.

IF multiple facial feature finding subsystems with unique physical perspectives are used
   THEN
     QUERY each subsystem
     IF the format of the output from the vision subsystems is 2D
     THEN Perform parallax calculations to derive 3D positions of features by comparing results from sensors or cameras at different positions
     FOR each potential face detection (as expressed now in 3D terms)
     Scale and rotate potential detected facial features into a normal form
     Compare potential detected facial features with FACE-PROTOTYPE
     IF there is good fit between a sufficient number of features in the potential detected facial features and the face prototype
     THEN
       FOR each potential detected facial feature (or only for those that are sufficiently divergent from the face prototype)
         DETERMINE if it was visible to the camera(s) that detected it
         IF it was not visible
           THEN replace it with the values from the face prototype COMMENT This is a conventional calculation of occlusion determined by the geometry of the camera location and the hull of the face prototype.
     ELSE
       Ignore that detection instance
     APPLY Bayesian or other conventional techniques to achieve sensor fusion, turning the multiple potential face detections into a single, more robust face detection
     IF latest head position is impossible (too fast a jump from recent positions to be physiologically possible)

THEN
   Ignore reading and lower confidence level
ELSE
   Raise confidence level
PREDICT near term head Position/Orientations using Kalman filters or other convention predictive filer techniques
STORE data in FACEFUTURE PREDICT near term facial landmark positions, based on variations from recent results
STORE data in FACEPOSEFUTURE COMMENT FACEPOSEFUTURE will play a role in reducing apparent latency in the visual channel for remote users looking at the local user.

FUNCTION FACE_NOT_CURRENTLY_TRACKED
   IF the reason for not tracking is ONLY that the latest predicted frustums (each eye has a different one) would NOT have intersected the AREA OF INTEREST COMMENT If a user looks away from the area of interest, COCODEX stops tracking the user's face. This is the means by which the concept of "Pseudo-immersion" is implemented. A user can look away from remote users, virtual displays, and whatever else is deemed important on the other side of the COCODEX screen in order to pay attention to a local physical person or tool. The ability to quickly move between physical and virtual interactions is one of the central contributions of the COCODEX design.

It is also important for human communications, since in many cultures people look away from one another much of the time while speaking.

This capability in the control software also influences the choice of the physical display component. For instance, a spatial audio display, with enhanced functionality due to the reduced range of placements relative to the user's head, can provide an audio cue when the user is not looking at the display. A remote participant can speak, and the local user will turn to look in the direction of the apparent source of the remote participant's voice. The local user is then looking back into the AREA OF INTEREST, which results in the tracking process being re-initiated. The desirability of this scenario of use, in which the local user has instant access to both local and remote people, tools, and other resources, suggests the utility of the flat display as a choice, even though peripheral vision will be lost as a result. A happy coincidence of the COCODEX design is that lower-cost flat displays happen to provide enhanced value because of the strategy of "Pseudo-immersion" described here.

THEN Sensor/display assembly should wait where it is, since the user's head will probably re-enter in a similar place
   ELSE IF the reason for not tracking is that the user is grabbing assembly
     THEN Assume head remains in last predicted position and point there again when the user lets go of the assembly
   ELSE IF tracking has been lost for unknown reasons
     THEN
       Adjust lighting elements mounted on COCODEX to compensate for local lighting conditions COMMENT Currently available machine vision systems for sensing the human face are highly sensitive to lighting conditions. For instance, shadows caused by lighting from above can harm performance. LED or other lighting elements in the COCODEX display/sensor assembly provide a light source that moves approximately with the face to compensate for local light source anomalies. Comparing overall scene brightness between cameras mounted at different angles generates an approximate measure of the presence of this potential problem. In the event that there is heavy ceiling light, for instance, the lower LEDs, which face upwards, are more strongly illuminated to compensate.

Use conventional incremental area search algorithms to move COCODEX arm to search for user
     Use conventional adaptive recovery techniques in case there's a software problem; Introduce drift into control parameters.
     If nothing works, eventually give up; set CONFIDENCE to nil
   ELSE (Suggesting the system was just turned on or it's been a long time since a user's head was tracked)
     CALL FUNCTION MOVE_COCODEX_ARM to move the assembly into default position (or whatever other action is deemed appropriate for "waiting")
   CALL FUNCTION KEEP_TRACK_OF_FACE
   IF there is a detection instance
     THEN
       RAISE value of CONFIDENCE
     ELSE
       LOWER value of CONFIDENCE COMMENT When CONFIDENCE gets high enough, this function is not called. The CONFIDENCE variable is being used here as a simple feedback signal to govern a pattern classification sub-system that will sometimes be well "locked on" to a pattern and sometimes not. Many other established methods are available as well.

FUNCTION COCODEX_HAPTICS

COMMENT There are three sources of motion of the COCODEX arm: Manual intervention by the user, and two automatic sources: Face tracking and haptic display. This function reconciles these control sources.

The most common form of haptic feedback is based on the idea of a single abstract point of contact between a haptic input/output device and a virtual model. An example of a common device which implements this type of haptic interaction is the Phantom arm. The Phantom can be pressed against the outside of a virtual object, for instance, allowing the contours of the object to be felt by the user. COCODEX can support point-based haptics, emulating a device like the Phantom. In that case, the center of the COCODEX physical screen is typically treated as the point of contact, and a graphical indicator of that point, typically crosshairs, is added to the TELE-LAYOUT.

COCODEX also supports a planar mode of haptic interaction. For planar interaction, the haptic properties of a set of points (in the planar area intersecting the virtual world that corresponds to the instant physical position of the COCODEX display) are combined into a display of force and resistance, including curl.

The PLANAR Haptic feedback map determines resistance and force to be displayed by the arm as a function of the position and orientation of the assembly at the end of the arm. The map is calculated as specified by the TELE_LAYOUT.

For instance, the TELE-LAYOUT can specify that scalar values associated with voxels be treated as resistance values. An example of when this is useful is in radiology. Darker voxels are set to be more resistant, so as the COCODEX assembly is manually guided through an area of volumetric data, a user feels the "center" of resistance of the display plane, corresponding to the location of a tumor. 3D volumes of scalar values can be analyzed using classical techniques to generate vectors for force field simulations. In other cases, vector information will already be defined for each voxel. This typically is the case in physical simulation applications, for instance. Another application is the creation of 6D "detents," or "sticky" position/orientations for the assembly.

In this pseudocode, a distinction is drawn between resistance and force display, as expressed by FORCE-RESISTANCE-VECTOR and REPULSION-FIELD-VECTOR. These two domains need not be distinguished, but in practice most resistance information will be locally cached, such as volumetric medical imaging data, while most force field information, such as the "Repulsion field" of another user's head (explained below,) is remote and therefore has network latencies—thus the separation into distinct calculations and data structures.

An example of a use of the repulsion field is to reduce the chances that a local COCODEX screen position will intersect a remote collaborator's head. Voxels in the remote person's head are designated to be repulsive. When the head of that remote user approaches the corresponding location of some other user's COCODEX screen, that screen is pushed aside.

A "tele-haptics" capability is also supported. This allows remote collaborators to "Feel each other" as they co-explore complex data such as volumetric medical or geographical information. The visual display of data is tightly coupled with haptic and audio displays, creating a multimodal interface. A notable advantage of COCODEX is that capabilities such as tele-haptics are accessed using the same instrumentation principles as visual and audio features, so that individuals who have deficits or special abilities in particular sensory modalities can interact with other individuals with different deficits or abilities, without making any change to the interaction practice or instrumentation.

CALCULATE any changes needed to Haptic feedback map for current virtual world
    QUERY appropriate sensors and perform sensor fusion calculations to determine if user is grabbing Assembly COMMENT There are various ways a grab can be detected, including externally induced changes in force, rotation, or position sensors in the arm. An alternative is that the user can be required to touch a specific place or device to indicate a desire to grab, requiring additional sensors dedicated to the purpose, such as buttons or capacitive coupling sensors.

IF user is grabbing assembly
        THEN
            CALCULATE force vector user is applying to arm
            STORE it in USER-APPLIED-FORCE-VECTOR
        ELSE (user isn't grabbing COCODEX)
            SET USER-APPLIED-FORCE-VECTOR to nil
    IF the PLANAR Haptic feedback map includes scalar resistance values
        THEN
            CALCULATE the center of resistance for the area of voxels corresponding to the COCODEX display area (for clarity, use polar coordinate system)
            CONVERT the center of resistance to a vector centered on the center of physical connection between the COCODEX sensor/display assembly and the arm
            STORE result in FORCE-RESISTANCE-VECTOR
        ELSE
            SET FORCE-RESISTANCE-VECTOR to nil
    IF the PLANAR Haptic feedback map includes repulsion field values
        THEN
            CALCULATE the center and vector of repulsion for a volume of voxels containing the COCODEX display area (for clarity, use polar coordinate system)
            CONVERT the center and vector of repulsion to a vector centered on the center of physical connection between the COCODEX sensor/display assembly and the arm
            STORE result in REPULSION-FIELD-VECTOR
        ELSE
            SET REPULSION-FIELD-VECTOR to nil
    BLEND (FORCE-RESISTANCE-VECTOR and REPULSION-FIELD-VECTOR and USER-APPLIED-FORCE-VECTOR) with FACE-TRACKING VECTOR COMMENT The term "blend" is used here for vector calculations since there will generally be additional calculations applied to each vector prior to being summed, including scaling, filtering, and biasing.

IF result would not cause face tracking to fail (if the face would still fall within the IDEAL zone)
        THEN
            CALL FUNCTION MOVE_COCODEX_ARM with the calculated vector
        ELSE IF tracking would fail AND user or application preferences indicate that approximate haptics are preferred over none at all
            REDUCE contribution of the BLENDED vectors (FORCE-RESISTANCE-VECTOR, REPULSION-FIELD-VECTOR, and USER-APPLIED-FORCE-VECTOR) without scaling back influence of FACE-TRACKING VECTOR so that the result lies within IDEAL zone
            CALL FUNCTION MOVE_COCODEX_ARM with the calculated vector
        ELSE IF user or application preferences indicate that haptics should be accurate if displayed at all
            CALL FUNCTION MOVE_COCODEX_ARM with the FACE-TRACKING VECTOR only
            ACTIVATE user interface elements to alert the user to the presence of the problem
    IF local and remote assemblies come into approximate alignment in virtual space AND local and remote COCODEX units are being grabbed
        THEN, initiate tele-haptics
            TRANSFORM remote user's USER-APPLIED-FORCE-VECTOR so that it is correctly oriented in the local space
            ADD result to local user's USER-APPLIED-FORCE-VECTOR FUNCTION MOVE_COCODEX_ARM
    QUERY haptic subsystem on whether screen is being grabbed by user
    PERFORM collision avoidance procedure COMMENT Collision avoidance can be implemented using either COCODEX sensors or an additional collision avoidance system, or both.

Since COCODEX has a sensor array it can support collision avoidance without extra instrumentation, but there are multiple vendors of collision avoidance subsystems, so for the purposes of this pseudocode, collision avoidance isn't explained in detail.

IF (COCODEX is not being grabbed—AND—there is no indication of collision danger)

THEN
LOOKUP nearby positions in ROBOTIC-MOTION-CALIBRATION-TABLE
BASED on data from above LOOKUP, calculate robotic hardware control signals that are most likely to move arm as requested
IF hardware is predicted by calculations to be able to move as requested in this function call
THEN
MOVE arm according to calculations above COMMENT IF not, then system will wait until a better opportunity comes along, usually a bigger move that avoids overshooting.
CALL FUNCTION COCODEX_AUTO_SENSING
COMPARE results with corresponding entries in ROBOTIC-MOTION-CALIBRATION-TABLE
IF there is a discrepancy OR no corresponding entry yet exists
THEN update calibration table

FUNCTION COCODEX_AUTO_SENSING

COMMENT This function is for determining the current position of the display/sensor hardware assembly on the robot arm, as well as predicting future values.
IF COCODEX has just been powered up
THEN
Set CONFIDENCE to nil COMMENT face is not tracked yet.
PERFORM calibration on power-up and confirm that tracking is accurate COMMENT There are a variety of means of calibrating, or confirming the calibration of the position and rotation measurements of the COCODEX arm at startup. These include the use of cross-reference between multiple sensor systems as occurs during operation, as described below. But certain techniques are available only at startup. For instance, with many arm designs, the camera array will be able to see the COCODEX base when the robot arm turns it to look in that direction, so that it can see at least one known landmark to confirm calibration in one set of positions (those which make the base visible.)
QUERY most recent values for Display/sensor assembly Position/Orientation COMMENT Multiple means can be employed to determine arm pose. These can include rotation sensors in joints in the arm; various commercially available 3D or 6D tracking sensors using optical, RF, ultrasound, magnetic or other techniques to track components in known locations in the arm, or the use of sensors in the sensor/display assembly to track visual landmarks in the environment. This last option is possible because the TELE-LAYOUT can record a representation of the local environment that was gathered at an earlier time. Established techniques for visual landmark-based tracking can be applied to generate an additional source of data on arm pose.
APPLY conventional Bayesian or other techniques to achieve sensor fusion if more than one sensor subsystem is available COMMENT This process is foreseen because COCODEX requires accurate measurements of arm pose, but not accurate arm control; and the accuracy of arm control can be low because of cost concerns, therefore the varied sensors of the Display/sensor assembly might be applied to improve the accuracy of pose measurement.

STORE result in ASSEMVARS
PREDICT near term display/sensor assembly Position/Orientations using Kalman filters or other conventional predictive filtering technique
STORE result in ASSEMFUTURE
CHECK UI instrumentation COMMENT COCODEX can have a number of physical interaction devices attached to the sensor/display assembly. These can include handles to facilitate grabbing, buttons, dials, triggers, and the like.
STORE values in UI-VARS

FUNCTION COCODEX_AS_AVATAR

COMMENT The usual use of COCODEX is foreseen to be where one, or perhaps a small number of local users are collaborating with a potentially larger number of people at an unbounded number of remote sites. In the special case where there is a minority of remote users and a majority of physically present users, the COCODEX-AS-AVATAR mode can be selected. This corresponds to a recent stream of research demonstrations in which a remote user "pilots" a physical local robot that local human users can interact with as if the remote human user was present in the position of the robot. When the COCODEX-AS-AVATAR mode is turned on, a designated remote user's head is tracked by the COCODEX sensor/display assembly instead of the head of a local user. The COCODEX assembly appears to "look around" with the head motion of the remote user, and with the remote user's face centered in the screen. This effect is described by other researchers who have implemented robotic display devices for this sole purpose. The originality of invention here is not the COCODEX-AS-AVATAR formulation, but the fact that it is available conveniently as an option from a device (COCODEX) that is designed primarily for other uses. Note that the converse is not true. Remote robot devices such as those referred to above are NOT able to function like COCODEX.
CALCULATE the move for the arm that would place the sensor/display assembly in a position and orientation that matches as closely as possible the head position and orientation of the designated remote user (which implies that the assembly would be looking out from the remote user's perspective instead of inwards, towards the IDEAL zone, as would normally be the case)
CALL FUNCTION MOVE_COCODEX_ARM with results of above calculation

FUNCTION UPDATE_LOCAL_VIRTUAL_WORLD

COMMENT This function prepares the local virtual world for graphical rendering. This can be accomplished using a conventional display-list architecture or similar structure.

The subroutines below are in an approximate far-to-near order.

The elements of the TELE-LAYOUT are explained in the comments of this function.

Note that while assembling the virtual world and rendering are separate steps in this pseudo-code, it is often more efficient in practice to render elements as they are ready instead of waiting for a single render phase.
IF the TELE-LAYOUT includes a simulation of a giant screen for a command control room or another type of wall-sized display
THEN make sure it's in the display list COMMENT These elements generally become the effective background of the scene from the user's perspective.

This brings to light another one of COCODEX's strengths. Dedicated display rooms are becoming increasingly common. There are three principle forms: Command/control rooms in which many displays are present; CAVES in which the walls present a surrounding stereoscopic virtual environment; and Display Walls, in which a large image is generated from a tiling of smaller displays.

The disadvantages of dedicated rooms include real estate costs and scheduling bottlenecks. COCODEX can emulate much of the value of a dedicated room display with a portable desktop device that overcomes these problems.

IF the TELE-LAYOUT includes augmented reality effects
        Make sure a calibrated 3D representation of the local physical environment is in the display list COMMENT In effect the display simulates its own transparency. This is possible when there is data about the physical environment behind the COCODEX display/sensor assembly. This data can be gathered earlier by pointing the assembly in that direction, or there can be extra cameras pointing backwards, which can be additionally used for collision avoidance. The physical background should be rendered correctly to simulate transparency of the display to support an augmented reality effect. In effect the display simulates its own transparency. An alternative is to incorporate a display that is physically transparent but can convey the computer-generated imagery as an overlay.

IF the TELE-LAYOUT includes representations of the local physical environments at remote locations
        Make sure the remote physical environment is in the display list, according to specifications in the TELE-LAYOUT COMMENT The areas of transition between the environments of remote collaborators as they appear to the local user must make visual sense. One of the advantages of COCODEX is that it provides correct lines of sight between an arbitrary number of participants in an almost unlimited variety of configurations. At one extreme, a large number of geographically dispersed participants can be organized into an audience looking at a lecturer. The lecturer can look into the audience and not see too much in the way of local environment for each audience member, because of lack of room. At the other extreme, two collaborators can see into each other's local environments with no transitional areas between environments, because each participant can only see one remote environment at a time. The greatest need for transitions will arise when a small number (between 3 and 12) of participants convene in a virtual shared space. Each participant can define whether their local environment as seen by others will include physical elements as captured by COCODEX sensors, virtual elements, or a combination of real and virtual elements. The capturing of the local physical environment in advance or in real time has been well described in earlier Tele-immersion research, as has the use of purely synthetic environments. What is appropriate for COCODEX is dynamic transitional areas, because previous tele-immersion systems imposed fixed geometries on the spatial relationships between collaborators, while COCODEX allows flexibility. The TELE-LAYOUT specifies the transition technique to be used. Some common techniques will be: Placing a virtual wall or partition between adjacent localities to prevent objects in either locality from touching; A blending or fading between localities; An alignment of elements of localities so that they make approximate sense when they are physically adjacent. At a minimum certain horizontal elements, such as tabletops and floors can be aligned, and some wall elements; and certain furniture items can be made to "match," as in the case of two desk surfaces being merged into one larger desk where both participants are seated.

IF the TELE-LAYOUT includes simulations of conventional 2D displays within the 3D virtual environment
        Make sure they are in the display list COMMENT For instance, if a conventional computer (showing a 2D display with a web browser, for instance) is included in the TELE-LAYOUT, that display will be implemented as an animated texture mapped on the geometry of the virtual 2D display.

Whenever the COCODEX display is brought into alignment with a virtual 2D display within the TELE-LAYOUT, the physical COCODEX display becomes an emulation of that 2D display.

IF the TELE-LAYOUT includes 3D objects or data
        Make sure corresponding elements are in the display list
        If the local user is grabbing the assembly
            THEN render the cut-plane through 3D objects or data as an enhanced 2D image aligned on the COCODEX display surface, where the assembly intersects a 3D object.

COMMENT The enhanced cut-plane rendering is optional. An example of such a rendering is that the transparency, brightness, or saturation of the cut-plane can be modified. It is sometimes desirable for the cut-plane to be transparent to enhance clarity of the user's sense of 6D placement in the 3D scene. The 3D components are then visible both in front of and behind the cut-plane. An opaque cut-plane can also be chosen without any 3D data visible in front of or behind it. Medical professionals generally make use of both modes of operation. A simple way to toggle between them in COCODEX is to grab and let go of the assembly, or make use of the UI-VARS to interpolate the two modes.

One of COCODEX's benefits is the physical manipulation of a 6D cut-plane through volumetric data. This is useful in particular for medical and certain scientific data. A long-standing problem in medical imaging is the difficulty of interpreting cut-plane imagery if the cut-plane can be rotated in arbitrary ways. By using physical manipulation of the display to change the orientation of a cut-plane, users will not have to rely on mental rotation (which most people find very difficult) to interpret the results.

IF the TELE-LAYOUT includes remote participants
        FOR EACH remote participant
            CALL FUNCTION ASSEMBLE_COMPOUND_PORTRAIT
    IF a remote user is grabbing his or her sensor/display assembly
        Make sure the display list contains a representation of the location of the remote display frame and the average (of the two eyes) viewing frustum for that user.

COMMENT This is another interesting quality of COCODEX: with COCODEX it is easy to design user interface elements which indicate interest and activity of users to each other. One user can see where another's display is while grabbed, facilitating joint exploration of data.

IF user interface actions are undertaken by a remote user whose display position is being displayed
        Make sure the display list contains representations of them, as defined by a given application or operating software for COCODEX COMMENT For instance, the frame of the remote frustum will appear to brighten for a moment if the corresponding remote user clicks on a button in the user interface of the assembly. The frustum will also appear to cast momentary light on objects in the environment during operations on them.
   IF the TELE-LAYOUT includes a local virtual mirror
      Make sure the display list contains a mirror with a view of user and local environment that reflects data being sent to remote sites.

FUNCTION COCODEX_NETWORK_COMMUNICATIONS
   IF local user is already engaged in a tele-immersion session with remote participants
      THEN
         IF ANOTHER station is serving as PREDICTIVE HUB for session COMMENT Since there are significant unavoidable latencies between stations distributed over large geographic distances, a station situated roughly in between other stations will in some cases be in the best position to receive the most recent updates from each locality to predict the informed near future interactions in the shared world. This station, whether or not a local user is present, will be designated the PREDICTIVE HUB.
      THEN
         STREAM local data to HUB COMMENT This includes almost all data mentioned in this pseudocode, though tremendous bandwidth can be saved by not sending unchanging data, which includes stationary elements in the local environment, like furniture.

The many streams of data are organized according to priority for low latency. The global variables above, the audio stream, and the portions of the Compound Portraits that are deemed high priority are the streams which are the most latency sensitive.
      ADJUST data streams as directed by HUB COMMENT If HUB requests less data, or indicates an ability to receive more, adjustments can be made to resolution of medium priority bit maps, wraparound head texture, and other variable streams. (See Compound Portrait functions below, for explanation.)
      RECEIVE similar data from HUB for all remote users COMMENT Data from other users goes through the HUB, which can change the data, since the HUB is charged with detecting collisions and other site-interaction events. For instance, in a virtual baseball game, the HUB computes when a bat hits a ball and sends resulting trajectories to participants.
   ELSE IF local station is functioning as PREDICTIVE HUB for session
      IF TELE-LAYOUT is already selected
         MERGE data from local and all remote stations
         CALCULATE potential collisions of other interactions between components of the scene in the predictive data from all sites
         REPORT potential interactions back to sites as needed by application COMMENT this is the fastest way to detect and report interactions
      MONITOR latencies for all stations, making use of timestamps
      IF a station displays high latency
         SEND request for smaller data streams
      IF a station displays low latency and is sending minimized data
         SEND request for larger data streams
      ELSE (no TELE-LAYOUT selected)
         CALL FUNCTION SETUP_TELE-LAYOUT
   ELSE if NO station is serving as PREDICTIVE HUB
      SEND local data to all stations and receive data from all stations
      USE conventional semaphore techniques to negotiate collisions and other interaction events
   ELSE (user is not currently engaged in session with remote collaborators or interlocutors)
      CALL FUNCTION SETUP_TELE-LAYOUT COMMENT The user interface for such things as starting new sessions, organizing the shared virtual environment, or adjusting one's appearance can either be in a conventional 2D display of a nearby computer, imbedded as a 3D user interface in the 3D COCODEX virtual world, or imbedded in a conventional 2D user interface found as a simulation within the virtual world.
   IF user has chosen to initiate a new multi-user session
      THEN
         All stations should ping each other and the one with the quickest and most reliable access to others becomes the HUB COMMENT Users usually choose from preset TELE-LAYOUTS which blend their local environments, including desks and so on, into shared arrangements. For instance, one preset places all participants around a round table, while another places one participant at a lectern in front of an audience containing the others. One advantage of COCODEX is that it doesn't impose a scheme on the relative placement of participants in the virtual space. A TELE-LAYOUT also defines the AREA OF INTEREST. If a user looks away from the AREA OF INTEREST, COCODEX will stop tracking that user so that he or she can observe the local physical environment.

FUNCTION PREPARE_COMPOUND_PORTRAIT

COMMENT: The function PREPARE_COMPOUND_PORTRAITURE is for preparing data to support visual display of the local user's face and other local elements both for remote collaborators and locally in a virtual mirror This pseudocode describes one particular technique of user rendering, called "Compound Portraiture," but while this choice is an aspect of this invention, and ideal for COCODEX, other user rendering strategies suitable for tele-immersion can be chosen instead.

Note that a corresponding data set for hands or other objects can hypothetically be defined, with corresponding similar control software throughout. The hand presents special challenges because portions of fingers can be obscured more often than portions of faces. This pseudocode will not address these special challenges.
   LOCAL DATA structures for compound portraiture:
      Streaming graph of textures, with each streaming texture associated with a point on the facial features prototype
      Highest priority facial zones are tied to small high resolution images (Examples of the highest priority facial zones include the corners of the mouth and eyes)
      Medium priority facial zones are tied to larger medium resolution images (Examples of the medium priority facial zones include the brow and nostrils. The choice of which feature should be considered high or medium priority will vary with implementations, according to the performance of available network resources. In an ideal situation with excellent network resources, the entire face can be treated as Highest Priority.)

A wraparound streaming head texture of variable resolution, depending on network performance.

A streaming 3D graph of facial feature points, including one or more predictive sets of points A streaming set of textures associated with peripheral elements of the user's head such as large hairdos or hats.

The ORTHO-HALO, a set of orthogonal ring-shaped virtual objects that surround the head, serving as projection surfaces for large objects that surround a head, but are not modeled accurately, such as large hairstyles or hats.

COMMENT all the above are time stamped
(END definitions of local data)
BEGIN
GATHER highest available resolution image data from key points on face.
  FOR each of the highest priority facial zones
    Determine, using conventional trigonometry, how centered each camera was on top of the zone in the most recent image gathering cycle (excluding cameras that were occluded)
    IF a single camera was better positioned than others, select a portion of the image around the feature
    ELSE if two or more cameras were equally centered on top of a zone, use conventional image-based rendering techniques to merge a portion of each image around the feature into a single image of the feature
  FOR each of the medium priority facial zones, do the same as above, but use conventional image sampling techniques to reduce the resolution of the images of the features COMMENT This resolution reduction is in anticipation of a need to reduce bandwidth
  USE conventional image-based techniques to create a wraparound texture of the user's head.
  USE conventional techniques such as image sequence subtraction to find elements of the scene that are moving with the head that lie outside of the area corresponding to the facial feature model. (These will be used as textures for the "ortho-halo")

FUNCTION ASSEMBLE_COMPOUND_PORTRAIT

COMMENT This function assembles a representation of a remote participant from asynchronous streaming data as gathered by an instance of PREPARE_COMPOUND_PORTRAIT running on the remote participant's COCODEX.
  DISTORT a FACE-PROTOTYPE according to the time-matched values of the FACEPOSEFUTURE stream for that user COMMENT Facial pose for remote participants is being predicted in order to reduce apparent latency in the visual channel.
  WRAP the wraparound texture on the distorted wireframe head
  BLEND in higher resolution streaming textures for the high and medium priority areas of the face, in the locations of the corresponding facial feature points
  ADD stylistic elements, such as shinier reflectance for eyeballs or lips.
  ADD "ortho-halo" element to handle large hair or hats
    Use image based techniques to render them approximately as they would be seen from the local viewer's angle of view
    Use transparency to make the boundaries between these elements and the larger environment ambiguous.
  ADD conventional image based or volumetric techniques to render torso, arms, or other visible parts of participants at correct viewing angle for local user.
  APPLY optional modifications that the local user might have chosen, such as virtual makeup, jewelry, and so on.
  APPLY filters, lighting, and other established techniques to soften portions of remote users that are less reliably rendered FUNCTION AUTOSTEREO_RENDERING
  IF UI-VARS indicate a modification to the viewing perspective
    THEN modify perspective accordingly in all following steps COMMENT While the common mode of use of COCODEX is as a window into a 1-1 scaled virtual world, it is sometimes desirable to modify the viewing perspective. For instance, a spring-loaded macro/micro select lever attached to the assembly has no effect if it is not touched. As the lever is moved by the user's touch towards the macro position, the perspective of the virtual scene shown in the COCODEX display becomes wider and the position of the virtual head (from which points of view are derived) moves to being on a surrounding virtual sphere, looking into the scene. The further the lever is moved, the larger the reference sphere becomes. In this way a user can grab the assembly and move it to explore points of view on the virtual scene from an exterior perspective. In a similar way, moving the lever towards the micro direction magnifies the scene. In this case, rotating the screen moves the point-of-view among virtual inward-looking points of view on the surface of a sphere, as before, but with the effect of changing the power of a microscope lens as the sphere changes size; and moving the display position changes the virtual position of the center of the sphere. The position of the point-of-view can be adjusted in a way that includes momentum and acceleration by a different button or control, without any micro- or macro-zoom component, in which case physically moving the COCODEX window can have the effect of causing the point of view to race around within the virtual space, as if it were the windshield of a racecar. Turning the display turns the virtual racecar and moving the display forward and back applies forward and reverse power.
  IF the display hardware is autostereo with two perspective viewing zones, such as a dual exit pupil display, or lenticular or parallax barrier displays
    Adjust the IDEAL viewing zone to be sufficiently small, so that the COCODEX arm will keep the transition between viewing zones effectively placed between the user's eyes
  IF a dual exit pupil display is used
    Anti-distort scene using conventional techniques to compensate for changing positions of optical components due to arm motion COMMENT Dual perspective autostereo has traditionally required that users reduce head motion, and COCODEX offers a means around that limitation. In particular, dual exit pupil designs are made compact without restricting head motion ELSE IF display has >2 perspective zones, such as certain lenticular or parallax barrier displays COMMENT There is available art about combining eye tracking with multiperspective autostereo. One advantage of COCODEX, however, is that you can make sure a user's eyes won't fall into undefined or pseudoscopic zones because you can move the display to avoid that orientation.

Note that the pseudocode below applies equally well to a single local user or a small number of local users, when there are enough viewing zones to give each eye for each user a unique view.

FOR each eye
        Determine which viewing zone perspective is visible to the eye
        Render scene for that perspective as viewed from the precise eye position
        If an eye is predicted (by FACEFUTURE) to be about to cross into another viewing perspective
            Gradually (but fast enough to anticipate the crossing,) bring the 6D rendering alignment of the adjacent perspective zone into alignment so that the user will not perceive a transition as the eye crosses between perspective zones
            Gradually let the 6D rendering alignment of the previously seen perspective drift back to a cantered position.
            Gradual motion is to avoid visible "jumping" motion artifacts
        IF two eyes are projected to move into the same viewing zone, calculate how to move display to avoid the problem and do so.
        IF an eye is projected to move into an undefined, pseudoscopic, or otherwise undesirable or illegal viewing zone, calculate how to move the sensor/display assembly to avoid the problem and do so.

COMMENT If there is only one local user (two eyes) then these are not a difficult calculations. The display is simply moved in order to bring the position of the eyes into separate legal viewing zones. If there are multiple local users, the calculation becomes more difficult. The assembly is moved so that the IDEAL zone which contains all eyes is contained between illegal viewing zones, but there is also the possibility that local users can be placed so that each eye sees distinct legal views, but an illegal zone is in between them.

IF despite attempts to avoid problems, two eyes share a perspective for a period of time
        THEN gradually adjust the rendering of that perspective to be at the average of the ideal for the two eyes while the problem persists COMMENT Because 3D eye position is known, it's possible to build a 3D calibration table for a particular lenticular display to correct for subpixel alignment problems.

ELSE IF the display is conventional (no autostereo)
        Render from either dominant eye or mid-head perspective; user's choice

FUNCTION COCODEX_SOUND

Comment There is extensive work in 3D sound gathering and presentation, so COCODEX will have no shortage of audio subsystems which can be used.

Therefore, this function will be simple.
    ISOLATE local User Voice
    CALL commercially available full duplex audio telephone subsystem to send voice to remote users
    PLACE sounds of remote users in spatially correct locations using means present in audio subsystem
    GATHER environmental sounds with microphone array
    STREAM to other users
    RENDER environmental sounds from other users with speaker array or binaural techniques for extreme near field stereo speakers

FUNCTION SETUP_TELE-LAYOUT

COMMENT COCODEX requires a user interface to set up TELE-LAYOUTS, initiate and end calls, and perform the usual functions of a personal telecommunications or information processing tool. There is no requirement that these functions be performed exclusively with the use of COCODEX, however. All these functions can be performed on a conventional computer placed on the desk next to COCODEX, or simulated within a COCODEX TELE-LAYOUT. Existing virtual world design tools and 3D modeling products already provide the editing and visualization capabilities required, and must be extended to link with the variables defined above in order to provide output useful for this invention. Available tools are extensible to provide these links.

What is claimed is:

1. A system, comprising:
a communication system;
first and second display and capture systems each locally capturing images and sound and transmitting the locally captured images and sound over the communication system, and receiving remotely captured images and sound and displaying/playing the remotely captured images and sound to a viewer and where each display and capture system comprises:
a desk top robotic movable arm having three degrees of freedom;
a movable display connected to an end of the movable arm, having three degrees of freedom and movable independently of the arm and displaying the remotely captured images and a common stereo image;
a stereo/autostereo image projection system associated with the display for projecting a stereo image of the captured images to a viewer of the display and having a preferred viewing angle;
near field speakers producing stereo sound from the remotely captured sound;
video sensors including cameras mounted on the display and for capturing a stereo image of a head of a viewer viewing the display;
light sources in association with the video sensors;
sound sensors including microphones mounted on the display for capturing stereo sound from the head of the viewer viewing the display;
a touch sensitive handle attached to the display/arm allowing a user to move the display and providing direction and movement amount outputs; and
a computer system,
communicating with the communication system;
processing the locally captured stereo image using Kalman filter to determine a head position and head orientation of the head of the viewer;
processing the locally captured stereo image to determine an eye position of the viewer;
adjusting a position of the movable arm and the movable display, when the handle is not being touched, to maintain the head of the viewer within the viewing angle and responsive to an environmental constraint map indicating objects within the movement range of the display and arm;

adjusting a position of the movable arm and the movable display responsive to the direction and movement amount outputs when the handle is being touched;

transmitting the locally captured images and sound, the head position and orientation, the eye position and the display/arm position through the communication system; processing remotely captured images for display through the stereo image projection system by the movable display;

processing remotely captured sound and providing the stereo sound to the speakers;

processing the remotely captured images to determine a viewing frustum of a remote viewer responsive to the remotely determined head position and orientation, eye position and the remote display/arm position and displaying the viewing frustum on the display associated with a view of the remote viewer showing an orientation of the remote viewer;

maintaining a 3D object in a common world coordinate system being viewed by the first and second systems;

determining a cut plane view of the 3D object on the display responsive to a position of the display with respect to the common world coordinate system, displaying a view of the 3D object on the display;

displaying the frustum of the remote viewer relative to the 3D object on the display; and displaying a representation of the cut plane view of the remote viewer on the display.

* * * * *

UNITED STATES PATENT AND TRADEMARK OFFICE
CERTIFICATE OF CORRECTION

PATENT NO. : 7,626,569 B2  Page 1 of 1
APPLICATION NO. : 11/255920
DATED : December 1, 2009
INVENTOR(S) : Jaron Lanier It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Second Day of November, 2010

David J. Kappos
*Director of the United States Patent and Trademark Office*